United States Patent
Manchenahally et al.

(10) Patent No.: US 12,450,536 B2
(45) Date of Patent: Oct. 21, 2025

(54) SYSTEM AND METHOD FOR SUPPLY CHAIN OPTIMIZATION BASED ON ORDER DATA

(71) Applicant: Walmart Apollo, LLC, Bentonville, AR (US)

(72) Inventors: Shantala Narasimha Murthy Manchenahally, Bangalore (IN); Venkata Ramkiran Balivada, Bangaluru (IN); Ankit Ajit Jain, Karnataka (IN); Kedarnath Reddy Vudayagiri, Andhra Pradesh (IN); Parveen Kumar, Haryana (IN)

(73) Assignee: Walmart Apollo, LLC, Bentonville, AR (US)

( * ) Notice: Subject to any disclaimer, the term of this patent is extended or adjusted under 35 U.S.C. 154(b) by 146 days.

(21) Appl. No.: 18/490,539

(22) Filed: Oct. 19, 2023

(65) Prior Publication Data

US 2025/0131354 A1 Apr. 24, 2025

(51) Int. Cl.
*G06Q 10/087* (2023.01)
*G06Q 10/0631* (2023.01)

(52) U.S. Cl.
CPC ...... *G06Q 10/06315* (2013.01); *G06Q 10/0874* (2025.08)

(58) Field of Classification Search
CPC .............. G06Q 10/08; G06Q 10/06315
See application file for complete search history.

(56) References Cited

U.S. PATENT DOCUMENTS

| | | | | |
|---|---|---|---|---|
| 6,341,266 B1* | 1/2002 | Braun | .................... | G06Q 10/06 705/7.26 |
| 8,352,382 B1* | 1/2013 | Katta | .................... | G06Q 10/087 705/330 |
| 9,505,559 B1* | 11/2016 | Cai | .................... | G06Q 10/083 |
| 2008/0140688 A1* | 6/2008 | Clayton | .............. | G06Q 10/0637 |
| 2010/0070450 A1* | 3/2010 | Barker | .................... | G06Q 30/06 706/59 |

(Continued)

OTHER PUBLICATIONS

Zhao, et al., Optimal production-inventory policy for an integrated multi-stage supply chain with time-varying demand, European Journal of Operational Research vol. 255, No. 2. 2016, pp. 364-379 (Year: 2016).*

(Continued)

*Primary Examiner* — Daniel Vetter
(74) *Attorney, Agent, or Firm* — Morgan, Lewis & Bockius LLP; Manita Rawat

(57) ABSTRACT

Systems and methods for allocating optimal supply chain resources based on order data are disclosed. In some embodiments, a disclosed method includes: receiving, from a computing device, an allocation request associated with an order; determining a customer node associated with the order, wherein the customer node is in a supply chain network; determining, based on the order and the customer node, a sub-network of the supply chain network; determining, based on cost information associated with the sub-network, at least one path from at least one source node to the customer node in the sub-network; generating supply chain allocation data for the order based on the at least one path; and transmitting the supply chain allocation data to the computing device.

18 Claims, 11 Drawing Sheets

(56) References Cited

U.S. PATENT DOCUMENTS

| | | | |
|---|---|---|---|
| 2014/0180958 A1 | 6/2014 | Arunapuram et al. | |
| 2015/0109287 A1* | 4/2015 | Grichnik | G06Q 10/087 345/589 |
| 2015/0254589 A1* | 9/2015 | Saxena | G06Q 10/087 705/7.25 |
| 2016/0063411 A1* | 3/2016 | Ravichandran | G06Q 10/06312 705/7.22 |
| 2016/0300173 A1* | 10/2016 | Grichnik | G06Q 10/06315 |
| 2019/0354544 A1* | 11/2019 | Hertz | G06Q 10/08 |
| 2020/0175472 A1 | 6/2020 | Kaiser et al. | |
| 2021/0042872 A1* | 2/2021 | Simpson | G06Q 10/08355 |
| 2022/0156693 A1* | 5/2022 | Singh | G06Q 10/08345 |
| 2022/0164765 A1* | 5/2022 | Masche-Pakkala | G06Q 10/08345 |
| 2022/0270043 A1* | 8/2022 | Le | G06Q 10/08345 |
| 2022/0318710 A1 | 10/2022 | Ouyang et al. | |
| 2023/0119881 A1* | 4/2023 | Makhija | G06Q 10/087 705/28 |
| 2023/0306347 A1* | 9/2023 | Evans | G06Q 10/06315 |
| 2023/0342795 A1* | 10/2023 | Choudhary | G06Q 10/087 |
| 2024/0354635 A1* | 10/2024 | Davaloo | G06Q 10/083 |

OTHER PUBLICATIONS

Hu, et al., ADAM: a web platform for graph-based modeling and optimization of supply chains, Computers & Chemical Engineering, vol. 165, 2022, No. 107911 (Year: 2022).*

Tang, et al., An improved ant colony optimisation algorithm for three-tier supply chain scheduling based on networked manufacturing, International Journal of Production Research, vol. 51, No. 13, 2013, pp. 3945-3962 (Year: 2013).*

Otala, et al., Graph-based modeling in shop scheduling problems: Review and extensions, Applied Sciences, vol. 11, No. 11, 2021, 4741 (Year: 2021).*

Liu, A Cross-Border e-Commerce Cold Chain Supply Inventory Planning Method Based on Risk Measurement Model, Mobile Information Systems, No. 1, 2022, 6318373 (Year: 2022).*

C. Farley et al., "Getting Armed for Omnichannel Success," Zethcon Corporation, Nov. 1, 2022, 17 pages.

S. Parande et al., "Tactical approach to identify and quarantine spurious node participation request in sensory application," International Journal of Electrical and Computer Engineering, vol. 10, No. 4, Aug. 2020, pp. 3451-3459.

* cited by examiner

SYSTEM AND METHOD FOR SUPPLY CHAIN OPTIMIZATION BASED ON ORDER DATA

TECHNICAL FIELD

This application relates generally to supply chain optimization and, more particularly, to systems and methods for allocating optimal supply chain resources based on order data.

BACKGROUND

A supply chain for a product can be a useful tool for companies to determine where a product has been, who has handled the product, and where the product is going. A supply chain optimization problem may be established to find an optimal (e.g. most cost-efficient) path in a supply chain network for any given order, e.g. a purchase order placed at a retailer store or an online retailer's website.

Existing solutions to the supply chain optimization problems are based on heuristic techniques or exact explicit mathematical formulas. Given that the supply chain optimization problem is non-deterministic polynomial-time (NP) hard and has extremely large scale, using exact and explicit mathematical formulas would be computationally intractable. In addition, the supply chain optimization problem is often combined with requirements with a broad range of inputs, events and scenarios.

Even using network optimization methods, each order would run a separate optimization algorithm to find the optimal path that can lead to a probable node. This requires calling the optimization algorithm linearly with the number of orders, which results in an unacceptable runtime and memory. Graph traversal algorithms do not scale well when presented with multiple edges between nodes, and cannot provide a good solution for the supply chain optimization problem either.

SUMMARY

The embodiments described herein are directed to systems and methods for allocating optimal supply chain resources based on order data.

In various embodiments, a system including a non-transitory memory configured to store instructions thereon and at least one processor is disclosed. The at least one processor is configured to read the instructions to: receive, from a computing device, an allocation request associated with an order; determine a customer node associated with the order, wherein the customer node is in a supply chain network; determine, based on the order and the customer node, a sub-network of the supply chain network; determine, based on cost information associated with the sub-network, at least one path from at least one source node to the customer node in the sub-network; generate supply chain allocation data for the order based on the at least one path; and transmit the supply chain allocation data to the computing device.

In various embodiments, a computer-implemented method is disclosed. The computer-implemented method includes: receiving, from a computing device, an allocation request associated with an order; determining a customer node associated with the order, wherein the customer node is in a supply chain network; determining, based on the order and the customer node, a sub-network of the supply chain network; determining, based on cost information associated with the sub-network, at least one path from at least one source node to the customer node in the sub-network; generating supply chain allocation data for the order based on the at least one path; and transmitting the supply chain allocation data to the computing device.

In various embodiments, a non-transitory computer readable medium having instructions stored thereon is disclosed. The instructions, when executed by at least one processor, cause at least one device to perform operations including: receiving, from a computing device, an allocation request associated with an order; determining a customer node associated with the order, wherein the customer node is in a supply chain network; determining, based on the order and the customer node, a sub-network of the supply chain network; determining, based on cost information associated with the sub-network, at least one path from at least one source node to the customer node in the sub-network; generating supply chain allocation data for the order based on the at least one path; and transmitting the supply chain allocation data to the computing device.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
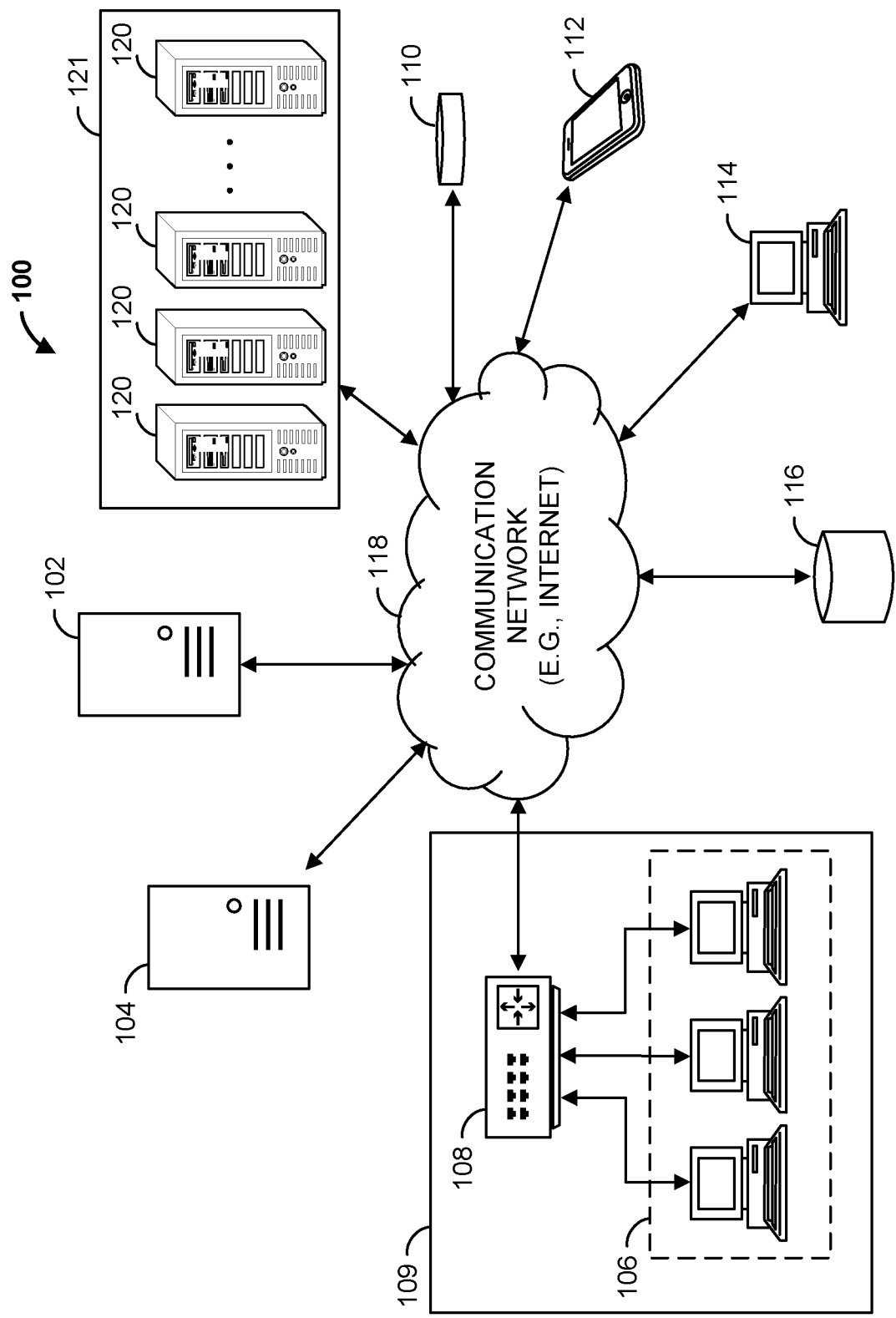
FIG. 1 is a network environment configured to allocate optimal supply chain resources, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

It is difficult to solve an optimization problem for a large-scale supply chain with multiple destinations and multiple sources and flows. One goal of the present teaching is to provide systems that can operate on a large-scale supply chain with the ability to simulate and optimize for multiple objectives and constraints, aiming at reduction of supply chain costs and increased efficiencies. The systems may use a combination of simulation, optimization and heuristics for operational, tactical and strategic use cases. In some embodiments, a disclosed system can simulate sourcing and minimum cost flow paths for a multi-commodity fulfillment problem on a retailer's supply chain network, which may be a large-scale multi-echelon network including several types of distribution centers and fulfillment nodes and stores.

Based on a solution to the supply chain optimization problem, the system provides for each customer order-line item: an optimally assigned source node, a flow path from the source node to the customer, and various resources allocated at both the nodes and the edges along the path. The solution provides the system a capability to simulate various scenarios caused by changes in network topologies, demand, inventory, capacity and service level agreement (SLA), and analyze their impact on business performance metrics.

In some embodiments, a disclosed system can decompose the supply chain optimization problem into multiple parts and solve them in multiple stages, respectively. The system can represent any supply chain using a network topology of arbitrary scale. For example, the network topology may be represented as a capacitated multi-relational graph. The representation may also encompass additional features such as capacities, costs, temporal aspects and types. The system can activate and deactivate portions of the network topology dynamically, altering the supply chain to mimic real world conditions. As cost structure changes with item-type, weight of the order, the system can solve for separate sub-graphs in parallel where each sub-graph represents a portion of the network that sources an order corresponding to a combination of item-type and weight.

The disclosed system can mimic a core objective of a heuristic method for minimizing supply chain costs by defining an approximately equivalent optimization model. The optimization problem can then be solved by a meta heuristic method, e.g. Ant Colony Optimization (ACO) method, with novel modifications like virtual-node addition and problem inversion during a first stage. Business constraints and rules that are outside the bounds of the optimization may be applied sequentially on the output of the first stage based on a prioritization scheme. The combination of the optimization solution and the sequential heuristic algorithm provide simulation capabilities for tactical and strategic use cases. The system can also simulate for multiple days on different fulfillment channel types.

In some embodiments, the disclosed system may solve the supply chain optimization problem with a two-stage approach. During the first stage, the system can compute and store optimal K paths between sourcing nodes and customer destinations on partitioned sub-graphs of the supply chain network/graph, contextually based on specific configurations, where K is a positive integer. During the second stage, the system can use the optimal K paths found in the first stage and perform a constraint-based order allocation iterating over these K paths to allocate an optimal path the a given order. In some examples, the system may use a modified version of ACO algorithm to compute the optimal K paths that can connect a customer node to source nodes during the first stage. In some examples, the system may use other network flow optimization algorithms, which makes the two-stage approach agnostic to any specific network flow optimization algorithm.

Furthermore, in the following, various embodiments are described with respect to methods and systems for allocating optimal supply chain resources based on order data are disclosed. In some embodiments, a disclosed method includes: receiving, from a computing device, an allocation request associated with an order; determining a customer node associated with the order, wherein the customer node is in a supply chain network; determining, based on the order and the customer node, a sub-network of the supply chain network; determining, based on cost information associated with the sub-network, at least one path from at least one source node to the customer node in the sub-network; generating supply chain allocation data for the order based on the at least one path; and transmitting the supply chain allocation data to the computing device.

Turning to the drawings, FIG. 1 is a network environment 100 configured to allocate optimal supply chain resources, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a supply chain allocation engine 102 (e.g., a server, such as an application server), a web server 104, a cloud-based engine 121 including one or more processing devices 120, workstation(s) 106, a database 116, and one or more user computing devices 110, 112, 114 operatively coupled over the network 118. The supply chain allocation engine 102, the web server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the supply chain allocation engine 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the supply chain allocation engine 102.

In some examples, each of the multiple user computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites providing one or more products or services. In some examples, the supply chain allocation engine 102, the processing devices 120, and/or the web server 104 are operated by a retailer. The multiple user computing devices 110, 112, 114 may be operated by customers or advertisers associated with the retailer websites. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a store 109 of a retailer, for example. The workstation(s) 106 can communicate with the supply chain allocation engine 102 over the communication network 118. The workstation(s) 106 may send data to, and receive data from, the supply chain allocation engine 102. For example, the workstation(s) 106 may transmit data identifying items purchased by a customer at the store 109 to the supply chain allocation engine 102.

Although FIG. 1 illustrates three user computing devices 110, 112, 114, the network environment 100 can include any number of user computing devices 110, 112, 114. Similarly, the network environment 100 can include any number of the supply chain allocation engines 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

In some embodiments, each of the first user computing device 110, the second user computing device 112, and the Nth user computing device 114 may communicate with the web server 104 over the communication network 118. For example, each of the multiple computing devices 110, 112, 114 may be operable to view, access, and interact with a website, such as a retailer's website hosted by the web server 104. The web server 104 may transmit user session data related to a customer's activity (e.g., interactions) on the website.

In some examples, a customer may operate one of the user computing devices 110, 112, 114 to initiate a web browser that is directed to the website hosted by the web server 104. The customer may, via the web browser, view item advertisements for items displayed on the website, and may click on item advertisements, for example. The website may capture these activities as user session data, and transmit the user session data to the supply chain allocation engine 102 over the communication network 118. The website may also allow the customer to add one or more of the items to an online shopping cart, and allow the customer to perform a "checkout" of the shopping cart to purchase the items. In some examples, the web server 104 transmits purchase data identifying items the customer has purchased from the website to the supply chain allocation engine 102.

In some examples, a customer, e.g., a customer of an online retailer, may operate one of the user computing devices 110, 112, 114 to initiate a web browser or a user interface that is associated with a website hosted by the web server 104. The customer may, via the web browser or the user interface, view and search items offered on the website, add one or more items into cart, and/or place an order for items in the cart. The website may capture these activities as transaction or order data. The web server 104 may transmit the order data to the supply chain allocation engine 102 over the communication network 118, and/or store the order data to the database 116.

In some embodiments, the web server 104 may transmit an allocation request to the supply chain allocation engine 102, e.g. upon an order placed by a customer on the website. The allocation request may be sent standalone or together with order related data. In some examples, the allocation request may carry or indicate a destination for this order, e.g. a zip code for delivering the order, or a zip code of a store for picking up the order. In some examples, the allocation request may also carry or indicate items in the order, constraints for delivering the order, etc.

In some examples, the supply chain allocation engine 102 may execute one or more models (e.g., algorithms), such as a machine learning model, deep learning model, statistical model, etc., to allocate optimal supply chain resources. The supply chain allocation engine 102 may determine, based on the order data, a customer node in a supply chain network as a visual representation of a supply chain. The supply chain allocation engine 102 may then determine, based on the order data and the customer node, a sub-network of the supply chain network. At least one path from at least one source node to the customer node in the sub-network may be selected by the supply chain allocation engine 102 to generate supply chain allocation data for the order. The supply chain allocation engine 102 may then transmit the supply chain allocation data to indicate an optimal path for supplying items of the order from corresponding sources to the customer.

The supply chain allocation engine 102 is further operable to communicate with the database 116 over the communication network 118. For example, the supply chain allocation engine 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the supply chain allocation engine 102, in some examples, the database 116 can be a local storage device, such as a hard drive, a non-volatile memory, or a USB stick. The supply chain allocation engine 102 may store online purchase data received from the web server 104 in the database 116. The supply chain allocation engine 102 may receive in-store purchase data from different stores 109 and store them in the database 116. The supply chain allocation engine 102 may also receive from the web server 104 user session data identifying events associated with browsing sessions, and may store the user session data in the database 116. The supply chain allocation engine 102 may also determine advertising opportunity data for campaigns, and may store advertising opportunity data in the database 116.

In some embodiments, the web server 104 may transmit a supply chain optimization request to the supply chain allocation engine 102, e.g. upon a change of the supply chain, upon an event or holiday, an instruction from a manager, or upon a pre-configured periodic prediction job. Upon the supply chain optimization request, the supply chain allocation engine 102 may generate a supply chain network or graph as a visual representation of the supply chain. The supply chain network may comprise: source nodes representing distribution centers, fulfillment centers and/or stores; intermediate nodes representing destination delivery units and/or sortation centers; and customer nodes representing customers. The supply chain allocation engine 102 may divide the supply chain network into a plurality of sub-networks based on a trained network partition model, and compute optimal paths within each sub-network based on one or more trained network optimization models. The supply chain allocation engine 102 may store the optimal paths and the models into the database 116.

In some examples, the supply chain allocation engine 102 generates training data for a plurality of models (e.g., machine learning models, deep learning models, statistical models, algorithms, etc.). The supply chain allocation engine 102 trains the models based on their corresponding training data, and stores the models in a database, such as in the database 116 (e.g., a cloud storage). In some embodiments, the supply chain allocation engine 102 may perform model training upon a request from the web server 104. In some embodiments, the supply chain allocation engine 102 may perform model training automatically without any request from the web server 104.

The models, when executed by the supply chain allocation engine 102, allow the supply chain allocation engine 102 to allocate optimal supply chain resources for orders. In some examples, the supply chain allocation engine 102 assigns the models (or parts thereof) for execution to one or more processing devices 120. For example, each model may be assigned to a virtual machine hosted by a processing device 120. The virtual machine may cause the models or parts thereof to execute on one or more processing units such as GPUs. In some examples, the virtual machines assign each model (or part thereof) among a plurality of processing units. Based on the output of the models, the supply chain allocation engine 102 may generate supply chain allocation data for each order in an efficient and effective manner.

Figure 2:
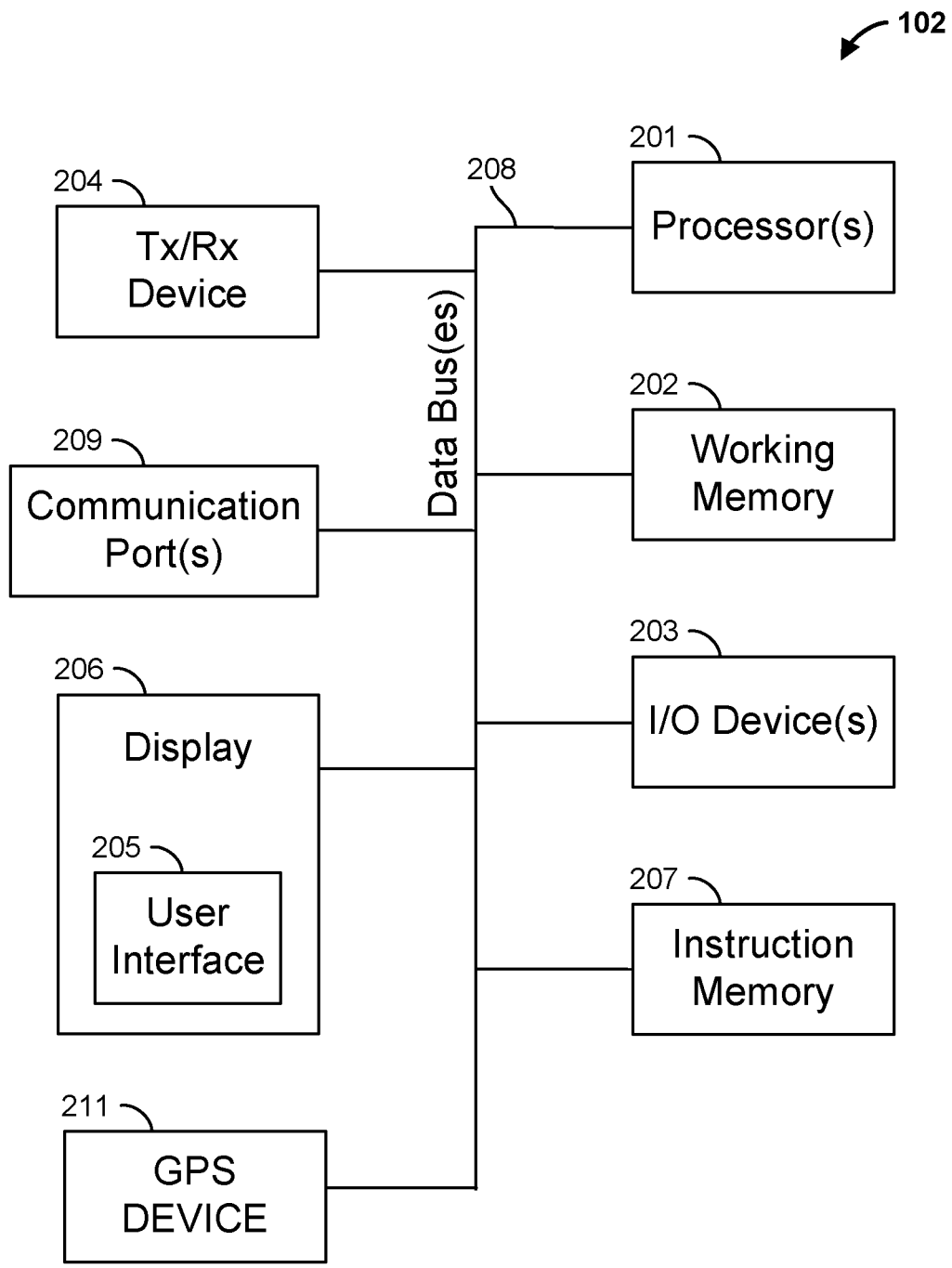
FIG. 2 is a block diagram of a supply chain allocation engine, in accordance with some embodiments of the present teaching.

FIG. 2 illustrates a block diagram of a supply chain allocation engine, e.g. the supply chain allocation engine 102 of FIG. 1, in accordance with some embodiments of the present teaching. In some embodiments, each of the supply chain allocation engine 102, the web server 104, the multiple user computing devices 110, 112, 114, and the one or more processing devices 120 in FIG. 1 may include the features shown in FIG. 2. Although FIG. 2 is described with respect to certain components shown therein, it will be appreciated that the elements of the supply chain allocation engine 102 can be combined, omitted, and/or replicated. In addition, it will be appreciated that additional elements other than those illustrated in FIG. 2 can be added to the supply chain allocation engine 102.

As shown in FIG. 2, the supply chain allocation engine 102 can include one or more processors 201, an instruction memory 207, a working memory 202, one or more input/output devices 203, one or more communication ports 209, a transceiver 204, a display 206 with a user interface 205, and an optional location device 211, all operatively coupled to one or more data buses 208. The data buses 208 allow for communication among the various components. The data buses 208 can include wired, or wireless, communication channels.

The one or more processors 201 can include any processing circuitry operable to control operations of the supply chain allocation engine 102. In some embodiments, the one or more processors 201 include one or more distinct processors, each having one or more cores (e.g., processing circuits). Each of the distinct processors can have the same or different structure. The one or more processors 201 can include one or more central processing units (CPUs), one or more graphics processing units (GPUs), application specific integrated circuits (ASICs), digital signal processors (DSPs), a chip multiprocessor (CMP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The one or more processors 201 may also be implemented by a controller, a microcontroller, an application specific integrated circuit (ASIC), a field programmable gate array (FPGA), a programmable logic device (PLD), etc.

In some embodiments, the one or more processors 201 are configured to implement an operating system (OS) and/or various applications. Examples of an OS include, for example, operating systems generally known under various trade names such as Apple macOS™, Microsoft Windows™, Android™, Linux™, and/or any other proprietary or open-source OS. Examples of applications include, for example, network applications, local applications, data input/output applications, user interaction applications, etc.

The instruction memory 207 can store instructions that can be accessed (e.g., read) and executed by at least one of the one or more processors 201. For example, the instruction memory 207 can be a non-transitory, computer-readable storage medium such as a read-only memory (ROM), an electrically erasable programmable read-only memory (EEPROM), flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. The one or more processors 201 can be configured to perform a certain function or operation by executing code, stored on the instruction memory 207, embodying the function or operation. For example, the one or more processors 201 can be configured to execute code stored in the instruction memory 207 to perform one or more of any function, method, or operation disclosed herein.

Additionally, the one or more processors 201 can store data to, and read data from, the working memory 202. For example, the one or more processors 201 can store a working set of instructions to the working memory 202, such as instructions loaded from the instruction memory 207. The one or more processors 201 can also use the working memory 202 to store dynamic data created during one or more operations. The working memory 202 can include, for example, random access memory (RAM) such as a static random access memory (SRAM) or dynamic random access memory (DRAM), Double-Data-Rate DRAM (DDR-RAM), synchronous DRAM (SDRAM), an EEPROM, flash memory (e.g. NOR and/or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, a removable disk, CD-ROM, any non-volatile memory, or any other suitable memory. Although embodiments are illustrated herein including separate instruction memory 207 and working memory 202, it will be appreciated that the supply chain allocation engine 102 can include a single memory unit configured to operate as both instruction memory and working memory. Further, although embodiments are discussed herein including non-volatile memory, it will be appreciated that the supply chain allocation engine 102 can include volatile memory components in addition to at least one non-volatile memory component.

In some embodiments, the instruction memory 207 and/or the working memory 202 includes an instruction set, in the form of a file for executing various methods, e.g. any method as described herein. The instruction set can be stored in any acceptable form of machine-readable instructions, including source code or various appropriate programming languages. Some examples of programming languages that can be used to store the instruction set include, but are not limited to: Java, JavaScript, C, C++, C#, Python, Objective-C, Visual Basic, .NET, HTML, CSS, SQL, NoSQL, Rust, Perl, etc. In some embodiments a compiler or interpreter is configured to convert the instruction set into machine executable code for execution by the one or more processors 201.

The input-output devices 203 can include any suitable device that allows for data input or output. For example, the input-output devices 203 can include one or more of a keyboard, a touchpad, a mouse, a stylus, a touchscreen, a physical button, a speaker, a microphone, a keypad, a click wheel, a motion sensor, a camera, and/or any other suitable input or output device.

The transceiver 204 and/or the communication port(s) 209 allow for communication with a network, such as the communication network 118 of FIG. 1. For example, if the communication network 118 of FIG. 1 is a cellular network, the transceiver 204 is configured to allow communications with the cellular network. In some embodiments, the transceiver 204 is selected based on the type of the communication network 118 the supply chain allocation engine 102 will be operating in. The one or more processors 201 are operable to receive data from, or send data to, a network, such as the communication network 118 of FIG. 1, via the transceiver 204.

The communication port(s) 209 may include any suitable hardware, software, and/or combination of hardware and software that is capable of coupling the supply chain allocation engine 102 to one or more networks and/or additional devices. The communication port(s) 209 can be arranged to operate with any suitable technique for controlling information signals using a desired set of communications protocols, services, or operating procedures. The communication port(s) 209 can include the appropriate physical connectors to connect with a corresponding communications medium, whether wired or wireless, for example, a serial port such as a universal asynchronous receiver/transmitter (UART) connection, a Universal Serial Bus (USB) connection, or any other suitable communication port or connection. In some embodiments, the communication port(s) 209 allows for the programming of executable instructions in the instruction memory 207. In some embodiments, the communication port(s) 209 allow for the transfer (e.g., uploading or downloading) of data, such as machine learning model training data.

In some embodiments, the communication port(s) 209 are configured to couple the supply chain allocation engine 102 to a network. The network can include local area networks (LAN) as well as wide area networks (WAN) including without limitation Internet, wired channels, wireless channels, communication devices including telephones, computers, wire, radio, optical and/or other electromagnetic channels, and combinations thereof, including other devices and/or components capable of/associated with communicating data. For example, the communication environments can include in-body communications, various devices, and various modes of communications such as wireless communications, wired communications, and combinations of the same.

In some embodiments, the transceiver 204 and/or the communication port(s) 209 are configured to utilize one or more communication protocols. Examples of wired protocols can include, but are not limited to, Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, etc. Examples of wireless protocols can include, but are not limited to, the Institute of Electrical and Electronics Engineers (IEEE) 802.xx series of protocols, such as IEEE 802.11a/b/g/n/ac/ag/ax/be, IEEE 802.16, IEEE 802.20, GSM cellular radiotelephone system protocols with GPRS, CDMA cellular radiotelephone communication systems with 1xRTT, EDGE systems, EV-DO systems, EV-DV systems, HSDPA systems, Wi-Fi Legacy, Wi-Fi 1/2/3/4/5/6/6E, wireless personal area network (PAN) protocols, Bluetooth Specification versions 5.0, 6, 7, legacy Bluetooth protocols, passive or active radio-frequency identification (RFID) protocols, Ultra-Wide Band (UWB), Digital Office (DO), Digital Home, Trusted Platform Module (TPM), ZigBee, etc.

The display 206 can be any suitable display, and may display the user interface 205. For example, the user interfaces 205 can enable user interaction with the supply chain allocation engine 102 and/or the web server 104. For example, the user interface 205 can be a user interface for an application of a network environment operator that allows a customer to view and interact with the operator's website. In some embodiments, a user can interact with the user interface 205 by engaging the input-output devices 203. In some embodiments, the display 206 can be a touchscreen, where the user interface 205 is displayed on the touchscreen.

The display 206 can include a screen such as, for example, a Liquid Crystal Display (LCD) screen, a light-emitting diode (LED) screen, an organic LED (OLED) screen, a movable display, a projection, etc. In some embodiments, the display 206 can include a coder/decoder, also known as Codecs, to convert digital media data into analog signals. For example, the visual peripheral output device can include video Codecs, audio Codecs, or any other suitable type of Codec.

The optional location device 211 may be communicatively coupled to a location network and operable to receive position data from the location network. For example, in some embodiments, the location device 211 includes a GPS device configured to receive position data identifying a latitude and longitude from one or more satellites of a GPS constellation. As another example, in some embodiments, the location device 211 is a cellular device configured to receive location data from one or more localized cellular towers. Based on the position data, the supply chain allocation engine 102 may determine a local geographical area (e.g., town, city, state, etc.) of its position.

In some embodiments, the supply chain allocation engine 102 is configured to implement one or more modules or engines, each of which is constructed, programmed, configured, or otherwise adapted, to autonomously carry out a function or set of functions. A module/engine can include a component or arrangement of components implemented using hardware, such as by an application specific integrated circuit (ASIC) or field-programmable gate array (FPGA), for example, or as a combination of hardware and software, such as by a microprocessor system and a set of program instructions that adapt the module/engine to implement the particular functionality, which (while being executed) transform the microprocessor system into a special-purpose device. A module/engine can also be implemented as a combination of the two, with certain functions facilitated by hardware alone, and other functions facilitated by a combination of hardware and software. In certain implementations, at least a portion, and in some cases, all, of a module/engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each module/engine can be realized in a variety of physically realizable configurations, and should generally not be limited to any particular implementation exemplified herein, unless such limitations are expressly called out. In addition, a module/engine can itself be composed of more than one sub-modules or sub-engines, each of which can be regarded as a module/engine in its own right. Moreover, in the embodiments described herein, each of the various modules/engines corresponds to a defined autonomous functionality; however, it should be understood that in other contemplated embodiments, each functionality can be distributed to more than one module/engine. Likewise, in other contemplated embodiments, multiple defined functionalities may be implemented by a single module/engine that performs those multiple functions, possibly alongside other functions, or distributed differently among a set of modules/engines than specifically illustrated in the embodiments herein.

Figure 3:
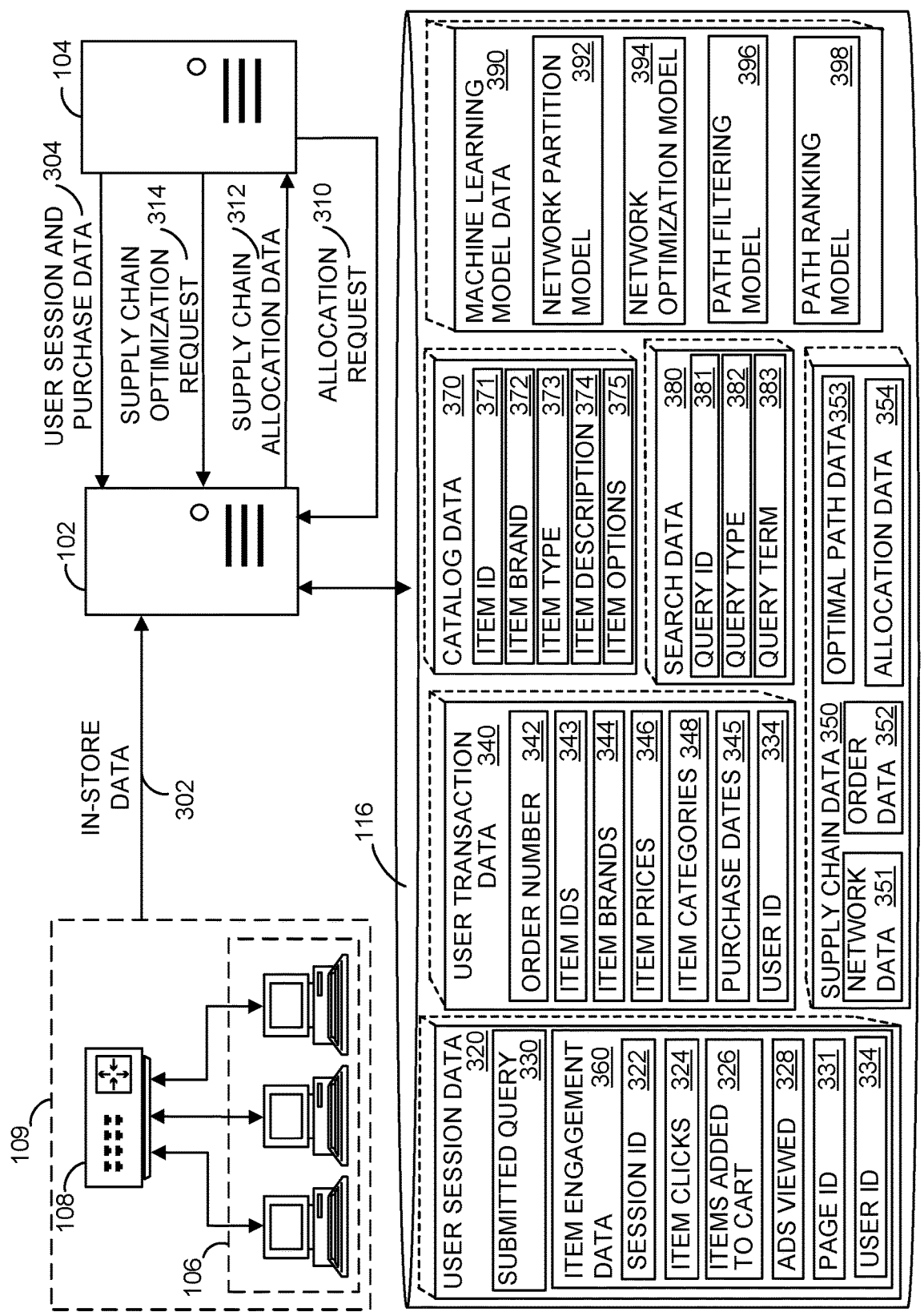
FIG. 3 is a block diagram illustrating various portions of a system for allocating optimal supply chain resources based on order data, in accordance with some embodiments of the present teaching.

FIG. 3 is a block diagram illustrating various portions of a system for allocating optimal supply chain resources based on order data, e.g. the system shown in the network environment 100 of FIG. 1, in accordance with some embodiments of the present teaching. As indicated in FIG. 3, the supply chain allocation engine 102 may receive user session and purchase data 304 from the web server 104. The user session and purchase data 304 may include user session data 320 identifying, for each user (e.g., customer), data related to that user's browsing session, such as when browsing a retailer's webpage hosted by the web server 104. The supply chain allocation engine 102 may store the user session data 320 into the database 116.

In some examples, the user session data 320 may include item engagement data 360 and/or submitted query data 330. The item engagement data 360 may include one or more of a session ID 322 (i.e., a website browsing session identifier), item clicks 324 identifying items which a user clicked (e.g., images of items for purchase, keywords to filter reviews for an item), items added-to-cart 326 identifying items added to the user's online shopping cart, advertisements viewed 328 identifying advertisements the user viewed and/or clicked during the browsing session, page ID 331 identifying a webpage (product page, search result page, home page, etc.) the user engaged with, and user ID 334 (e.g., a customer ID, retailer website login ID, a cookie ID, etc.). The submitted query data 330 may identify one or more searches conducted by a user during a browsing session (e.g., a current browsing session).

The user session and purchase data 304 may also identify and characterize one or more online purchases, such as purchases made by the user and other users via a retailer's website hosted by the web server 104. The supply chain allocation engine 102 may also receive in-store data 302 from the store 109, which identifies and characterizes one or more in-store purchases, in-store advertisements, in-store shopping data, etc. In some embodiments, the in-store data 302 may also indicate availability of items in the store 109, and/or user IDs that have selected the store 109 as a default store for picking up online orders.

The supply chain allocation engine 102 may parse the in-store data 302 and the user session and purchase data 304 to generate user transaction data 340. In this example, the user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item categories 348 identifying a category of each item purchased, a purchase date 345 identifying the purchase date of the purchase order, and user ID 334 for the user making the corresponding purchase.

The database 116 may further store catalog data 370, which may identify one or more attributes of a plurality of items, such as a portion of or all items a retailer carries. The catalog data 370 may identify, for each of the plurality of items, an item ID 371 (e.g., an SKU number), item brand 372, item type 373 (e.g., a product type like grocery item such as milk, clothing item), item description 374 (e.g., a description of the product including product features, such as ingredients, benefits, use or consumption instructions, or any other suitable description), and item options 375 (e.g., item colors, sizes, flavors, etc.).

The database 116 may also store search data 380, which may identify one or more attributes of a plurality of queries submitted by users on the website hosted by the web server 104 and/or on a website of a search engine associated with the web server 104. The search data 380 may include, for each of the plurality of queries, a query ID 381 identifying a query previously submitted by users, a query type 382 (e.g., a head query, a torso query, or a tail query), and query term 383 identifying terms in a query.

In some embodiments, the database 116 may further store supply chain data 350, which may identify data of supply chain used for items on the retailer's website hosted by the web server 104. The supply chain data 350 may identify, for each order on the website, network data 351 identifying a supply chain network as visual representation of the supply chain, order data 352 identifying data related to the order, optimal path data 353 identifying optimal paths previously identified in a sub-network containing a customer node representing the customer placing the order in the supply chain network, and allocation data 354 identifying supply chain allocation for providing items from corresponding sources in the supply chain network to the customer.

The database 116 may also store machine learning model data 390 identifying and characterizing one or more machine learning models and related data for allocating optimal supply chain resources based on order data. For example, the machine learning model data 390 may include a network partition model 392, a network optimization model 394, a path filtering model 396, and a path ranking model 398.

In some embodiments, the network partition model 392 may be used to divide a supply chain network into a plurality of sub-networks. The plurality of sub-networks may be different from each other according to at least one of: item types, item weights, assortment channels, or fulfillment channels. In supply chain, the cost to deliver a commodity or product may depend on weight and type of the product. For example, the transit cost for the product depends on weight, while the handling cost at a node depends on the type of the product, e.g. sortable, non-sortable, fresh. Because the costs to deliver depend on type and weight of items at hand, the system can divide the supply chain network into smaller (type, weight)-based sub-networks, to solve the supply chain optimization problem in reasonable time.

In some examples, an edge may connect two nodes in the supply chain network, represent a type of transportation between the two nodes, and be associated with cost and time to transport items between the two nodes. The network partition model 392 may also be used to divide the supply chain network into the plurality of sub-networks based on various criteria like item types, item weights, assortment channels, fulfillment channels associated with nodes and/or paths in the supply chain network.

The network optimization model 394 may be used to determine optimal paths in each sub-network of the supply chain network. In some embodiments, the network optimization model 394 may include an ant colony optimization model to be performed with a virtual node for determining optimal paths in each sub-network. The virtual node can be added to each respective sub-network as a common source node shared by all existing source nodes in the respective sub-network. The ant colony optimization model may be performed on the respective sub-network to determine K optimal inverse paths from a respective customer node to the virtual node, K being a positive integer. In some examples, the K optimal inverse paths have lowest total costs among all available paths from the respective customer node to the virtual node in the respective sub-network. Based on the K optimal inverse paths, the system can determine K optimal paths having lowest total costs among paths from all source nodes to the respective customer node in the respective sub-network, and store the K optimal paths in the database 116, e.g. as the optimal path data 353. In some embodiments, the system can select an optimal inverse path from the K optimal inverse paths, and store the optimal inverse path into the optimal path data 353.

The path filtering model 396 may be used to apply one or more constraints or conditions to further filter the optimal paths determined based on cost. The path filtering model 396 may be applied based on hard constraints that are required to be satisfied by all filtered paths, and soft constraints that are not required to be satisfied by all filtered paths. For example, the hard constraints may include constraints related to at least one of: inventory availability, inventory eligibility, carrier capacity, fulfillment capacity, transport channel eligibility, or node operation time; and the soft constraints may include constraints related to at least one of:

service level agreement (SLA), or estimated time to delivery. The inventory availability may indicate availability of inventory to deport from a node on a transport type, managed at inventory level and in-stock-rate at various levels of categorical granularity. The inventory eligibility may indicate eligibility of inventory to deport from a node on a transport type. The carrier capacity may indicate a capacity maintained at node-edge level and may be a capacity that a particular lane from a source node can handle on different days. The fulfillment capacity may indicate a capacity at node level, and may represent the quantum of orders that can be fulfilled from a node (e.g. source or intermediate nodes) on a given day. Both carrier capacity and fulfillment capacity may be available to fulfill the order in subsequent days, in case one cannot find either capacity on the order date. In such case, the only condition is to meet SLA as much as possible. The SLA constraints may refer to delivering an order within an agreed timeline. In some embodiments, the path ranking model 398 may be used to determine a ranking for multiple paths selected for an order, e.g. based on cost information and/or the soft constraints.

In some embodiments, the constraints may also include: eligibility constraints allowing only eligible transport channels to transfer or only eligible source nodes to allocate inventory; pick-ability constraint referring to picking source nodes for fulfilment with higher pick-ability score relative to other source nodes; and/or constraints on operating times at stores and/or fulfillment centers. When there are multiple orders, the sequential allocation of orders in first-in first-out (FIFO) mode according to arrival time of orders becomes a constraint as well.

In some examples, the supply chain allocation engine 102 receives (e.g., in real-time) from the web server 104, an allocation request 310 seeking an allocation of supply chain resources for an order. In response, the supply chain allocation engine 102 can determine a customer node associated with the order in a supply chain network; and determine, based on the order and the customer node, a sub-network of the supply chain network based on the network partition model 392. The supply chain allocation engine 102 may also determine, based on cost information associated with the sub-network, at least one path from at least one source node to the customer node in the sub-network, e.g. based on the network optimization model 394, the path filtering model 396 and/or the path ranking model 398. The supply chain allocation engine 102 can generate supply chain allocation data 312 for the order based on the at least one path, and transmit the supply chain allocation data 312 to the web server 104, for transporting items of the order from corresponding sources to the customer.

In some examples, the supply chain allocation engine 102 receives from the web server 104, a supply chain optimization request 314 for applying or training one or more models and optimizing the supply chain network. In some examples, the supply chain allocation engine 102 receives the supply chain optimization request 314 from a manager or engineer locally at the supply chain allocation engine 102. In response, the supply chain allocation engine 102 can generate the supply chain network and each sub-network based on the network partition model 392; and determine optimal paths in each sub-network based on the network optimization model 394.

In some embodiments, the supply chain allocation engine 102 may generate training data based on historical supply chain data, and use the training data to train any of the network partition model 392, the network optimization model 394, the path filtering model 396, and the path ranking model 398. In some embodiments, the supply chain allocation engine 102 itself may periodically train the models in the machine learning model data 390 and optimize the supply chain network, without any request from the web server 104.

In some embodiments, the supply chain allocation engine 102 may assign one or more of the operations described above to a different processing unit or virtual machine hosted by the one or more processing devices 120. Further, the supply chain allocation engine 102 may obtain the outputs of the these assigned operations from the processing units, to train the machine learning models or generate the supply chain allocation data 312 based on the outputs.

Figure 4:
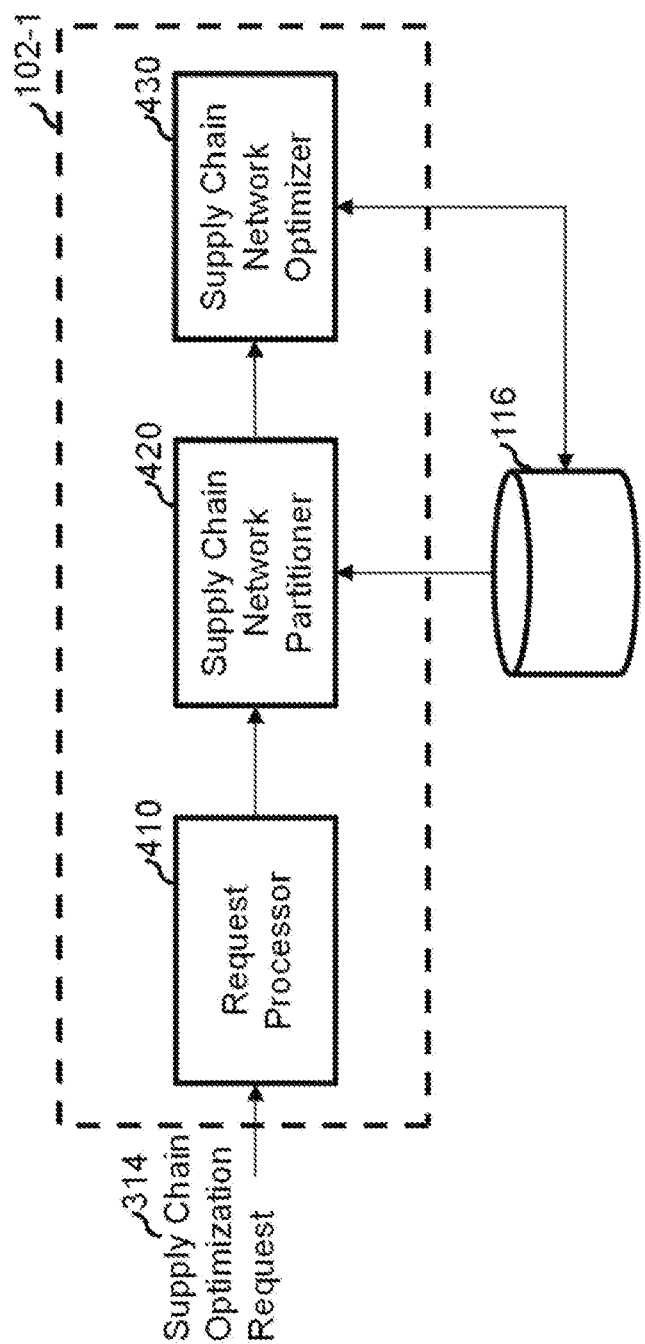
FIG. 4 is a block diagram illustrating various portions of a supply chain allocation engine during a first stage, in accordance with some embodiments of the present teaching.

FIG. 4 is a block diagram illustrating various portions of a supply chain allocation engine, e.g. the supply chain allocation engine 102 in FIG. 1, during a first stage, in accordance with some embodiments of the present teaching. As shown in FIG. 4, the supply chain allocation engine 102-1 during the first stage includes a request processor 410, a supply chain network partitioner 420, and a supply chain network optimizer 430. In some examples, one or more of the request processor 410, the supply chain network partitioner 420, and the supply chain network optimizer 430 are implemented in hardware. In some examples, one or more of the request processor 410, the supply chain network partitioner 420, and the supply chain network optimizer 430 are implemented as an executable program maintained in a tangible, non-transitory memory, such as instruction memory 207 of FIG. 2, which may be executed by one or processors, such as the processor 201 of FIG. 2.

In some examples, the request processor 410 may obtain from the web server 104 a supply chain optimization request 314 for training one or more models and optimizing the supply chain network. The supply chain optimization request 314 may or may not be triggered by the web server 104. In some embodiments, the supply chain optimization request 314 may be generated by the supply chain allocation engine 102-1 itself, e.g. periodically or based on a change of the supply chain. The request processor 410 may analyze the supply chain optimization request 314 to determine it is an optimization request, and retrieve the most updated supply chain data 350 for training and optimization. For example, the supply chain allocation engine 102-1 can retrieve the network data 351 from the database 116, and determine whether any node is removed or added, whether any edge is removed, added or modified. Since the optimal path data 353 and the allocation data 354 are associated with the network data 351, a change of the network data 351 may trigger an update of the optimal path data 353 and the allocation data 354.

The network data 351 may include data of the supply chain network, which may be a graph or any visual representation of the supply chain. The supply chain network may comprise edges and nodes. For example, the supply chain network may comprise: source nodes representing distribution centers, fulfillment centers and/or stores; intermediate nodes representing destination delivery units and/or sortation centers; and customer nodes representing customers. The intermediate nodes are located between the source nodes and the customer nodes (i.e. destination nodes) in the supply chain network. The supply chain network may comprise a plurality of edges, each of which connects two nodes in the supply chain network, represents a type of transportation between the two nodes, and is associated with cost and time to transport items between the two nodes.

In some embodiments, the supply chain network is a multi-echelon network, with multiple edges connecting source and destination. The supply chain network may be a dynamic network representation with changing network topology with respect to sources and destination. The supply chain network includes various nodes representing entities that are part of a multi-echelon network. Different nodes may have different attributes associated with them. There could be multiple edges in the supply chain network between any two different nodes. An edge between two nodes may represent a mode of transport (e.g. ground transport, air transport, etc.) available between the two nodes, where each edge is associated with the cost and time to serve. The request processor 410 may send the supply chain data to the supply chain network partitioner 420 for network partitioning.

In some embodiments, the supply chain network partitioner 420 can partition the supply chain network into a plurality of sub-networks, e.g. based on the network partition model 392 retrieved from the database 116. The plurality of sub-networks can cover all customer nodes in the supply chain network. In some embodiments, the plurality of sub-networks are different from each other according to at least one of: item types, item weights, assortment channels, or fulfillment channels. In some embodiments, each path from one node to another node in the supply chain network is associated with a corresponding total cost. In some examples, the total cost comprises: node costs for nodes along the path, including fixed or varying material cost for the source nodes and fixed or varying sortation cost for each sortation center; and edge costs for edges along the path, including fixed or varying cost related to each transportation type. Fixed cost may include rent, property tax, electricity bill, etc.; while varying cost may include handling cost and transportation cost that depend on the number of items. The cost information may be used for network partitioning and/or network optimization.

Figure 5A:
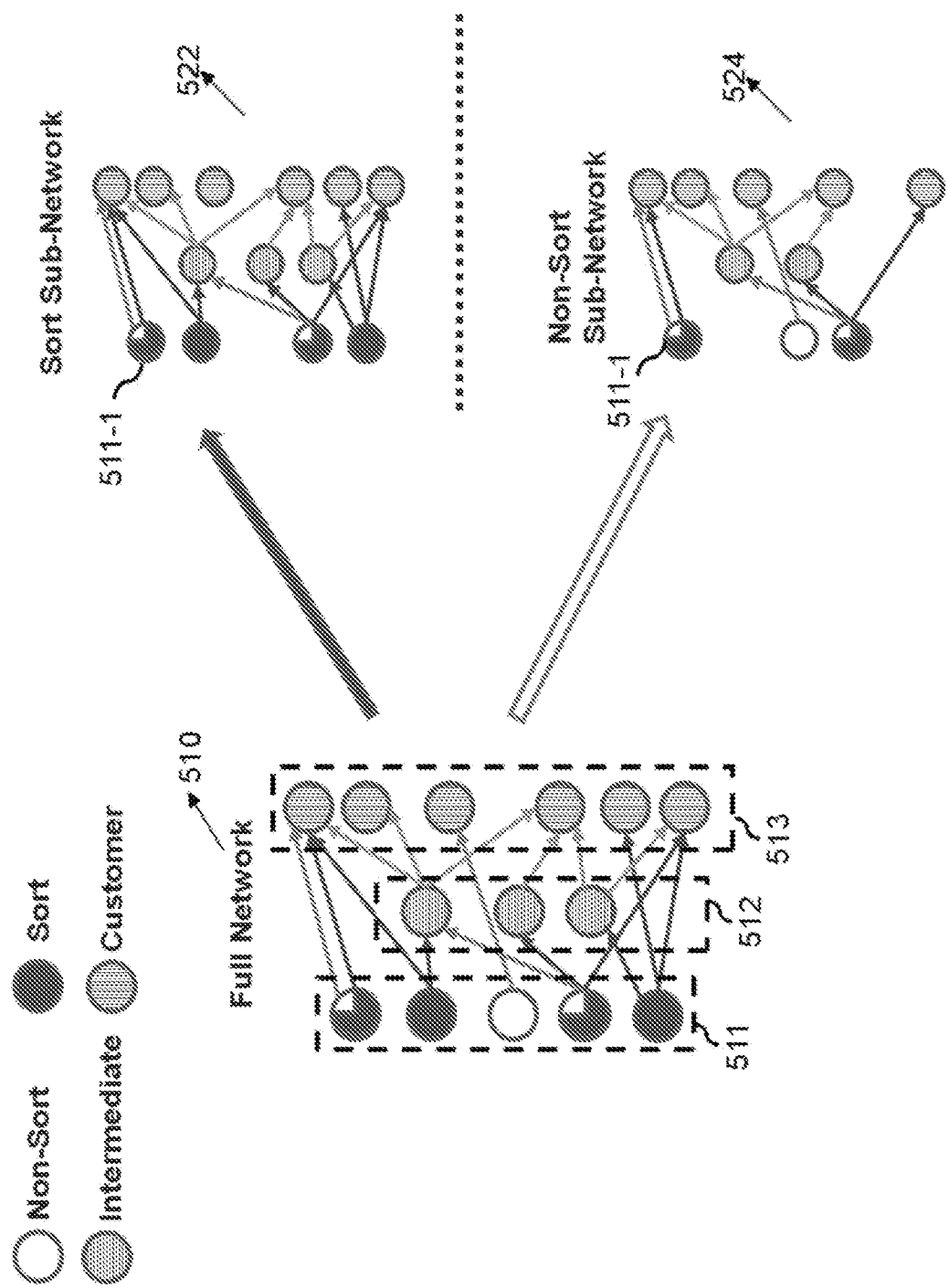
FIGS. 5A-5C illustrate an exemplary process for partitioning a supply chain network, in accordance with some embodiments of the present teaching.
Figure 5B:
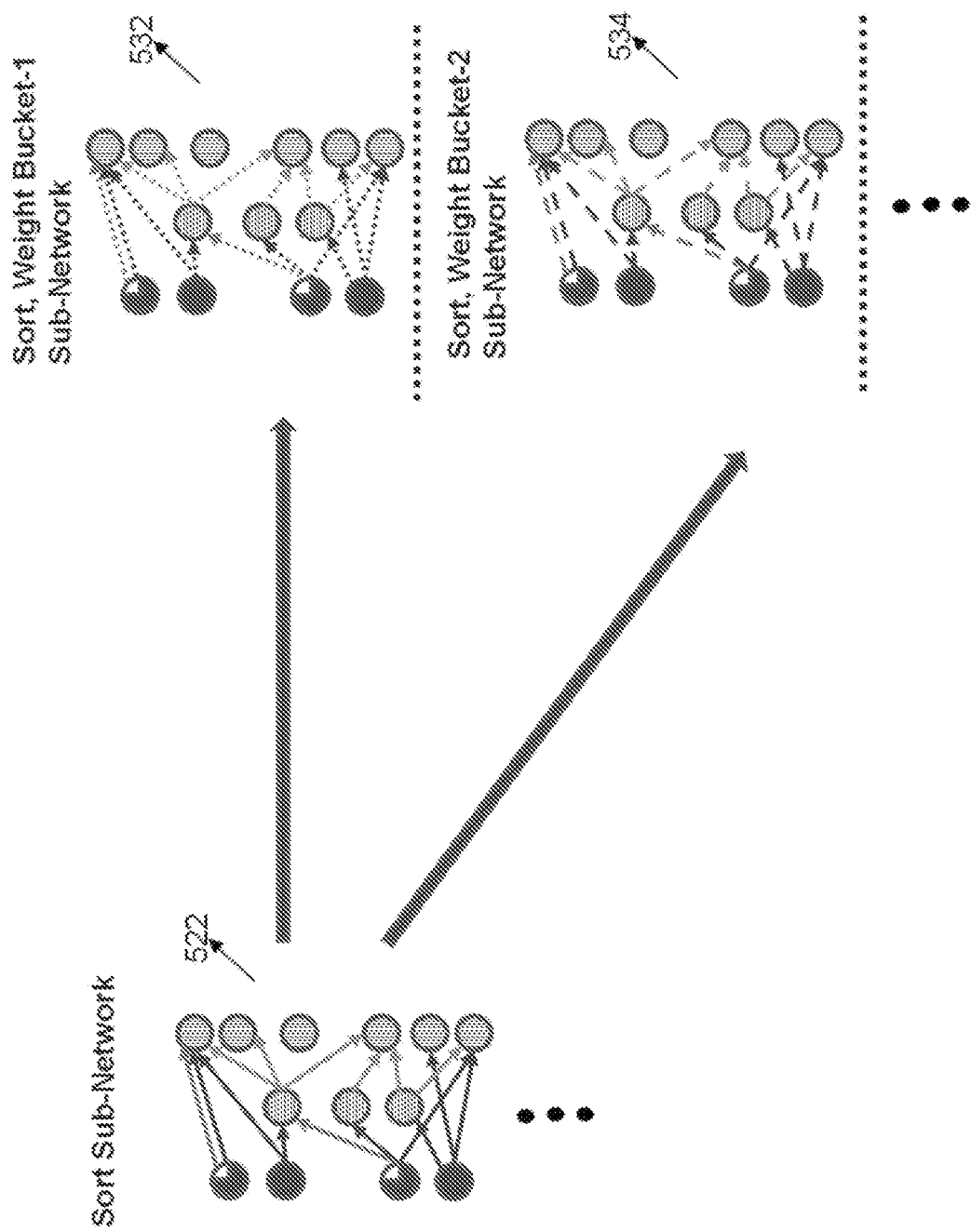
Figure 5C:
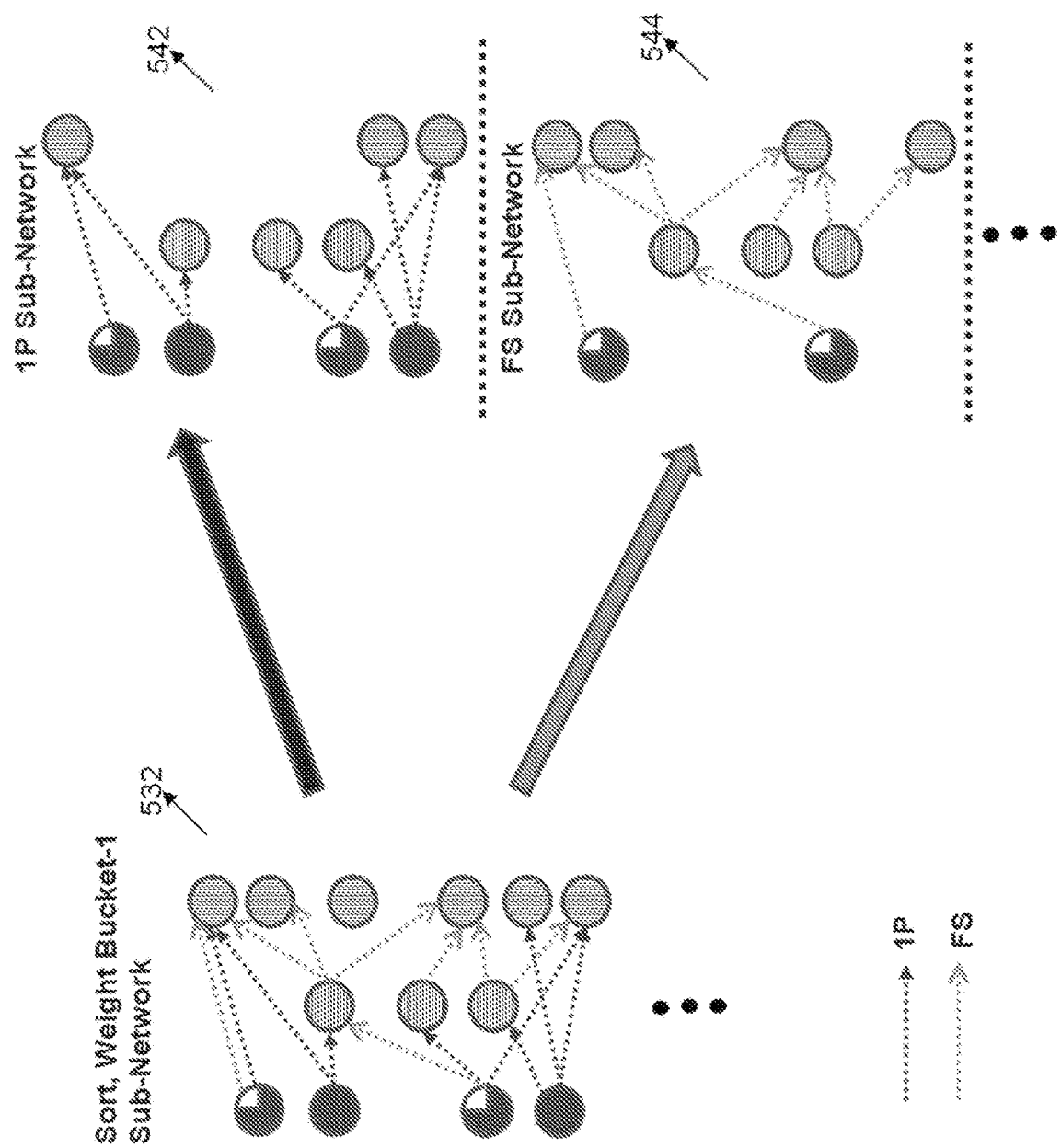

FIGS. 5A-5C illustrate an exemplary process for partitioning a supply chain network, in accordance with some embodiments of the present teaching. As shown in FIG. 5A, a full supply chain network 510 comprises source nodes 511, intermediate nodes 512, and customer nodes 513. In this example, the source nodes 511 may be either a sort source supporting sortable items, or a non-sort source supporting non-sortable items, or both. A sortable item may be a small item like a cup or a hat, that can be sorted by a machine with a conveyor belt to determine which lane to go; while a non-sortable item may be a big item like a refrigerator or a TV, that cannot or is not suitable to be sorted by a machine on a conveyor belt. In some embodiments, the supply chain network partitioner 420 can generate a plurality of first sub-networks 522, 524 of the supply chain network 510, where each first sub-network is associated with a respective item type. For example, the first sub-networks 522 may be a sort sub-network 522 that does not include any non-sort source node; while the first sub-networks 524 may be a non-sort sub-network 524 that does not include any sort source node. As shown in FIG. 5A, a source node that supports both sortable items and non-sortable items, e.g. source node 511-1, may be included in both the sort sub-network 522 and the non-sort sub-network 524. In some embodiments, the full supply chain network 510 may be divided into additional first sub-networks with different item types, e.g. another first sub-network for transporting fresh items.

In some embodiments, the supply chain network partitioner 420 can generate, based on each first sub-network, a plurality of second sub-networks, where each second sub-network is associated with a respective item weight range.

For example, as shown in FIG. 5B, the sort sub-network 522 may be further divided into multiple second sub-networks 532, 534. In this example, the sub-network 532 is a sort sub-network with weight bucket 1; and the sub-network 534 is a sort sub-network with weight bucket 2. Different weight buckets may correspond to different item weight ranges. That is, the sub-network 532 and the sub-network 534 include the same nodes; and for any edge connecting two nodes in the sub-network 532, there is a corresponding edge connecting the same two nodes in the sub-network 534. But an edge in the sub-network 532 and the corresponding edge in the sub-network 534 are associated with different item weight ranges for transporting items with different weight ranges. There may be more than two weight buckets divided out of a same first sub-network, e.g. the sort sub-network 522. In addition, although not shown in FIG. 5B, the non-sort sub-network 524 is also similarly divided into second sub-networks with different weight buckets or different item weight ranges.

In some embodiments, the supply chain network partitioner 420 can generate, based on each second sub-network, a plurality of third sub-networks, where each third sub-network is associated with a respective assortment channel. For example, as shown in FIG. 5C, while all edges in the sub-network 532 are associated with a same weight bucket, they are associated with different assortment channels, e.g. first party (1P) channel referring to items sold by the retailer directly, and fulfillment service (FS) channel referring to items sold by a third party using a FS provided by the retailer. In this example, the sub-network 532 may be further divided into multiple third sub-networks 542, 544. While the sub-network 542 is a 1P sub-network; the sub-network 544 is a FS sub-network. Both the sub-network 542 and the sub-network 544 are divided out of the sort sub-network 532 with weight bucket 1. In addition, although not shown in FIG. 5C, every other second sub-network generated according to the process in FIG. 5B is also similarly divided into third sub-networks associated with different assortment channels. In some embodiments, the supply chain network partitioner 420 can further divide the third sub-networks based on other features (e.g. scheduled or un-scheduled delivery, scheduled or un-scheduled pickup, etc.) to generate the plurality of sub-networks. In some embodiments, after the division or partition of the supply chain network, given any order, the order falls into one and only one of the plurality of sub-networks.

Referring back to FIG. 4, the supply chain network optimizer 430 may compute and determine optimal paths for each respective sub-network of the plurality of sub-networks determined by the supply chain network partitioner 420, e.g. based on the network optimization model 394 retrieved from the database 116. In some embodiments, the supply chain network optimizer 430 can add a virtual node to each respective sub-network as a common source node shared by all source nodes in the respective sub-network. Then, for each respective customer node in the respective sub-network, the supply chain network optimizer 430 may perform or apply an ant colony optimization model on the respective sub-network to determine K optimal inverse paths from the respective customer node to the virtual node, where K is a positive integer. The K optimal inverse paths have lowest total costs among paths from the respective customer node to the virtual node in the respective sub-network. Based on the K optimal inverse paths, the supply chain network optimizer 430 can determine K optimal paths having lowest total costs among paths from all source nodes to the respective customer node in the respective sub-network; and store the K optimal paths in a database, e.g. the database 116. In some embodiments, the system can select an optimal inverse path from the K optimal inverse paths, and directly store the optimal inverse path into the database 116.

Figure 6:
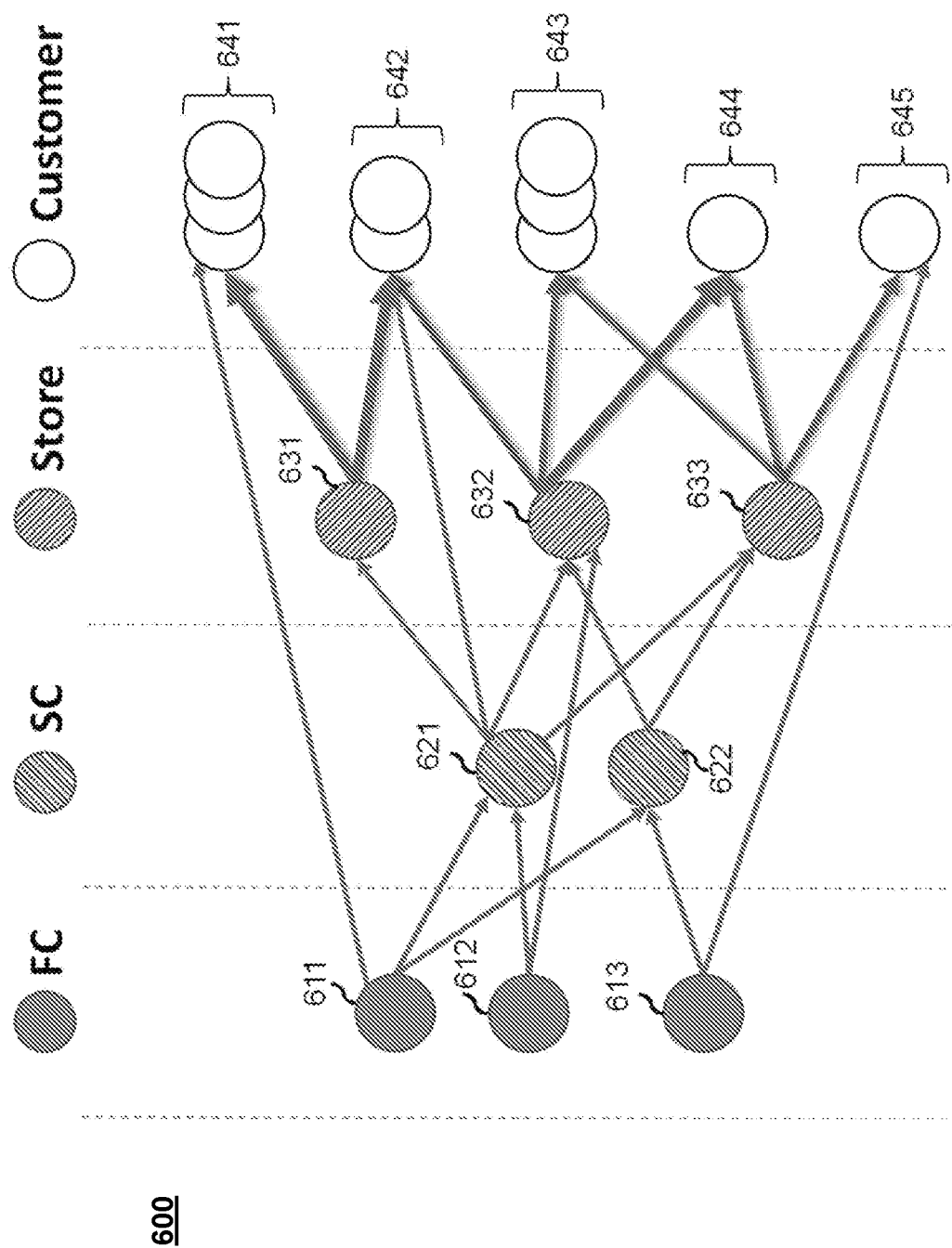
FIG. 6 illustrates an exemplary method for optimizing a supply chain network, in accordance with some embodiments of the present teaching.

FIG. 6 illustrates an exemplary method for optimizing a supply chain network, in accordance with some embodiments of the present teaching. FIG. 6 includes a supply chain network 600. In some embodiments, the supply chain network 600 may be a sub-network in any one of the FIGS. 5A-5C, and to be optimized to find optimal paths from various sourcing nodes to the customer nodes.

In the example shown in FIG. 6, the supply chain network 600 includes: source nodes 611, 612, 613 representing some fulfillment centers (FC), intermediate nodes 621, 622 representing some sortation centers (SC), intermediate nodes 631, 632, 633 representing some stores, and customer nodes 641, 642, 643, 644, 645 representing customers. In some examples, the customer nodes are clustered into different groups, each being associated with a different geographical area, e.g. a different zip code. For example, the customer node group 641 and the customer node group 642 are representing customers located in different zip codes.

In some embodiments, the system can apply a network optimization model to traverse through fixed edges from sources to destinations as defined in the supply chain network 600, which is a multi-source multi-destination graph here. In some examples, the network optimization model is an ant colony optimization (ACO) model. In some embodiments, each source node 611, 612, 613 is treated as an ant colony, and each customer node group 641, 642, 643, 644, 645 can be treated as a food source. In some examples, the pheromone deposit for each edge is an inverse of cost of traversing the edge.

The ACO model is a probabilistic technique for finding optimal paths, in terms of lowest cost of traversal, through the supply chain network 600 based on a combination of artificial ants (agents representing behavior of real ants) and a probabilistic decision rule. In some embodiments, the probabilistic decision rule is used by an artificial ant at every move. For example, an artificial ant can choose its next move probabilistically based on the pheromone (t) deposited according to the probabilistic decision rule. In some examples, each possible transition for an ant has a probability, and the ant follows the most probable transition at each move. In some examples, the probability of transition for each ant can be computed according to:

$$P_{ij} = \frac{(\tau_{ij})^\alpha (\eta_{ij})^\beta}{\sum_{j \in Cand} (\tau_{ij})^\alpha \cdot (\eta_{ij})^\beta} \quad (1)$$

where $\tau_{ij}$ represents a pheromone deposit for an edge between nodes i and j; $\eta$ is a heuristic factor in this example.

In some embodiments, an ant leaves a pheromone trail based on cost of traversal (inverse), according to:

$$\tau_{ij} = \tau_{ij} + \sum_{k \in mAnts} \Delta\tau_{ij}^k \quad (2)$$

$$\Delta\tau_{ij}^k = 1/c_k$$

where mAnts represents a colony of ants, each with a start state and an end state.

In some embodiments, a pheromone evaporation is performed by a constant factor, according to:

$$\tau_{ij} = (1-\rho)\tau_{ij} \qquad (3)$$

The above process may iterate over multiple ants in the mAnts till the solution converges.

Figure 7:
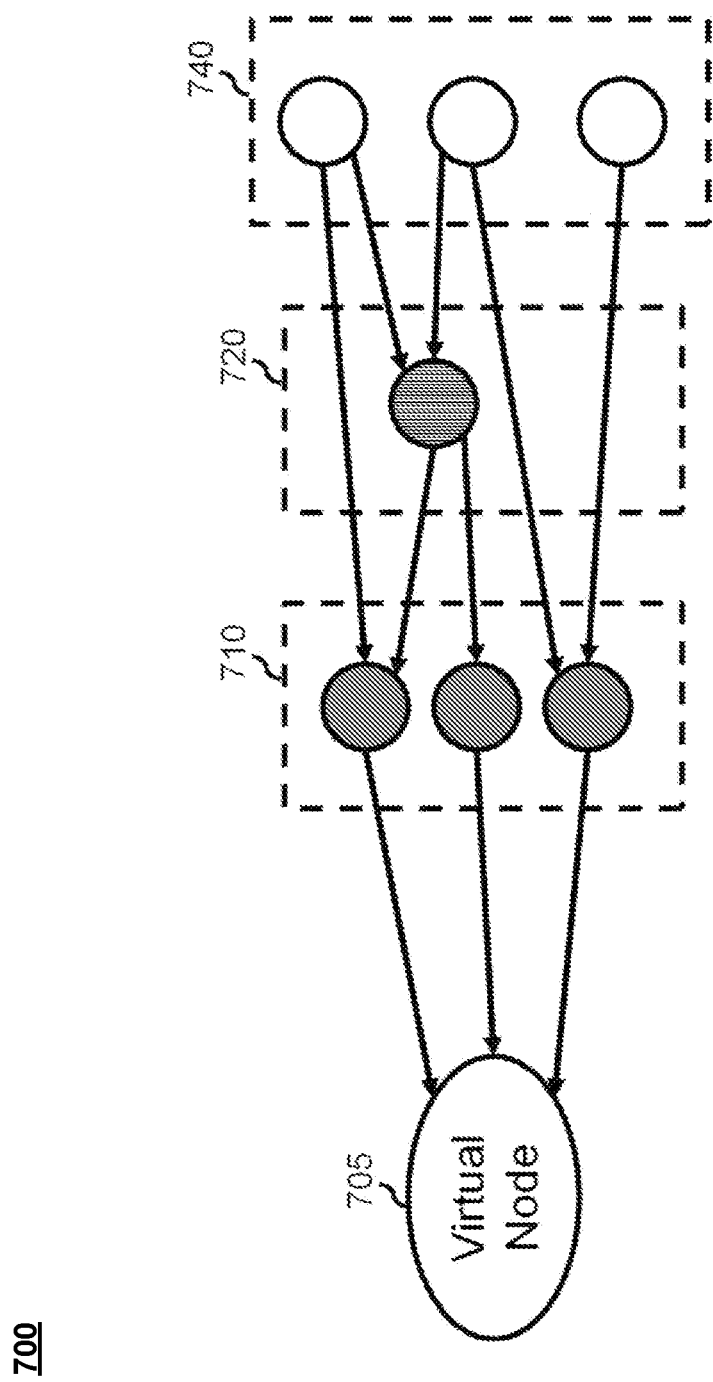
FIG. 7 illustrates an exemplary method for optimizing a supply chain network based on a virtual node, in accordance with some embodiments of the present teaching.

FIG. 7 illustrates an exemplary method for optimizing a supply chain network 700 based on a virtual node, in accordance with some embodiments of the present teaching. In some embodiments, the supply chain network 700 may be a sub-network in any one of the FIGS. 5A-5C, and to be optimized to find optimal paths from various sourcing nodes to the customer nodes.

In the example shown in FIG. 7, the supply chain network 700 includes: source nodes 710, intermediate nodes 720, and customer nodes 740. In some embodiments, the system can make one or more modifications when applying the ACO model. First, as shown in FIG. 7, a virtual node or ghost node 705 is added into the supply chain network 700, which can simplify the network optimization problem from a multi-source multi-destination problem to a single-source multi-destination problem. Second, a problem inversion is performed. As shown in FIG. 7, after the virtual node 705 is added as a shared node connecting the source nodes 710, the virtual node 705 is treated as a destination rather than a source in the supply chain network 700. It is much easier to solve a problem where multiple sources are merging to one destination in ACO, compared to another problem where one source goes to multiple destinations. With just one end node, all the ants will have to converge to that single end node, and thus no ant will be left with its journey incomplete.

But once the optimal inverse paths in the inversed problem are found from each source node (customer node in the supply chain network 700) to a corresponding destination node (source node in the supply chain network 700), the optimal paths are also found in the original problem due to cost and distance reciprocity of each edge in the supply chain network 700.

In some embodiments, each individual sub-network is optimized in parallel according to the same method disclosed above. That is, the system can run several ACO models in parallel on each sub-network. For example, the system can parallelize over all the nodes and parallelly update the pheromones on the edges and calculate the optimal paths.

In ACO, each ant colony separately updates the pheromone level along the edge they traverse. Since all the ant colonies are completely symmetric as being built on a single sub-graph or sub-network, multiple colonies can be optimized together, without considering the collision of constraints. In some embodiments, some paths taken by ants of different colonies may accumulate higher deposit. For one node and its out adjacent edges, higher capacity edges will have some higher pheromone, which is offset when choosing the first path to optimize greedily.

In some embodiments, each path in the supply chain network contains information related to the path like: path edges, cost and distance associated with that path, etc. These paths are stored, e.g. in the database 116, to be used in the second stage. Cost structure of the paths can be altered by defining a different parameter for pheromone used in the ACO model.

Figure 8:
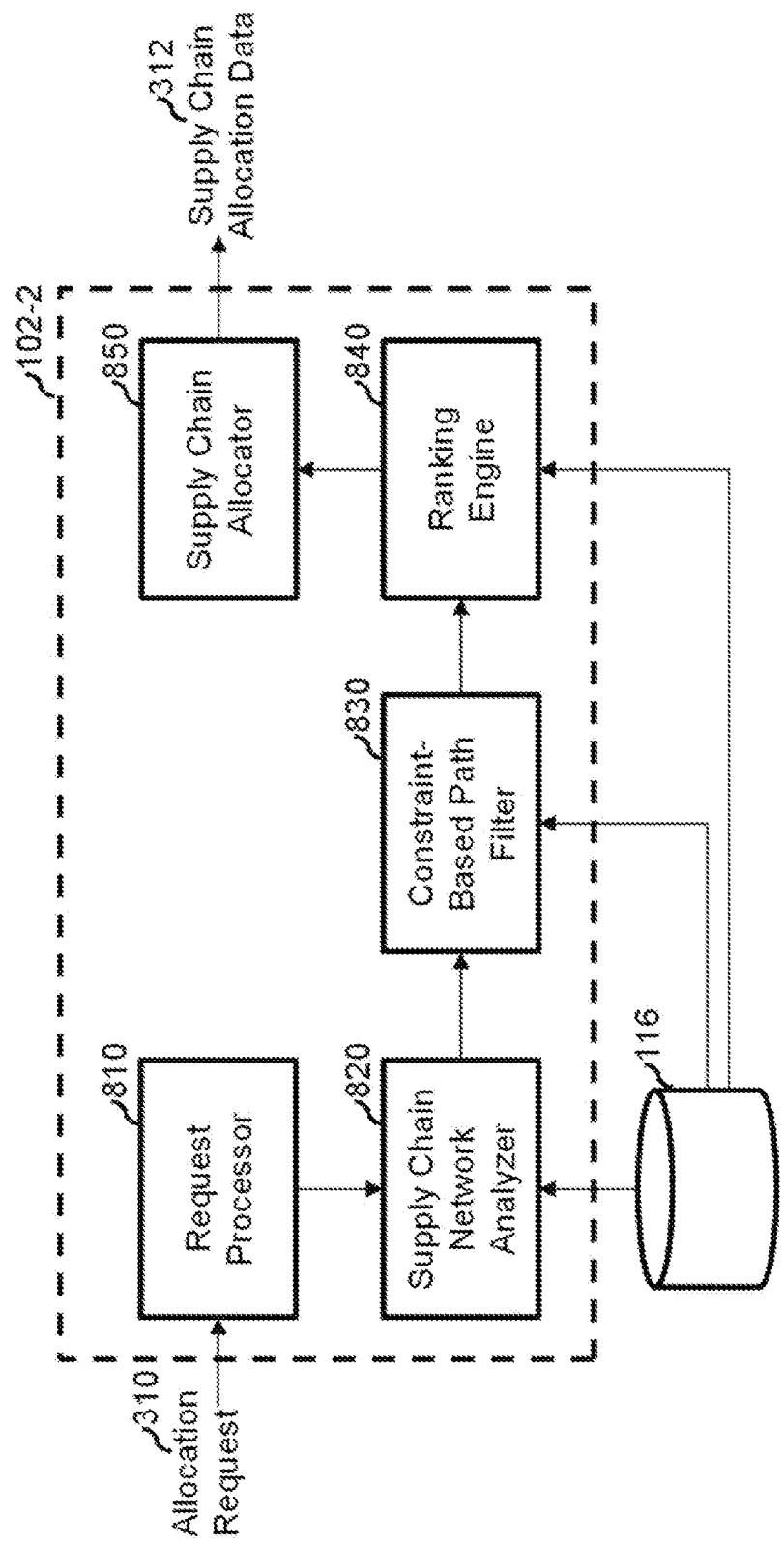
FIG. 8 is a block diagram illustrating various portions of a supply chain allocation engine during a second stage, in accordance with some embodiments of the present teaching.

FIG. 8 is a block diagram illustrating various portions of a supply chain allocation engine, e.g. the supply chain allocation engine 102 in FIG. 1, during a second stage, in accordance with some embodiments of the present teaching.

As shown in FIG. 8, the supply chain allocation engine 102-2 during the second stage includes a request processor 810, a supply chain network analyzer 820, a constraint-based path filter 830, a ranking engine 840, and a supply chain allocator 850. In some examples, one or more of the request processor 810, the supply chain network analyzer 820, the constraint-based path filter 830, the ranking engine 840 and the supply chain allocator 850 are implemented in hardware. In some examples, one or more of the request processor 810, the supply chain network analyzer 820, the constraint-based path filter 830, the ranking engine 840 and the supply chain allocator 850 are implemented as an executable program maintained in a tangible, non-transitory memory, such as instruction memory 207 of FIG. 2, which may be executed by one or processors, such as the processor 201 of FIG. 2.

The request processor 810 may have a same structure or be the same as the request processor 410 in FIG. 4. In some examples, the request processor 810 may obtain from the web server 104 an allocation request 310 for an order placed by a customer on a retailer's website hosted by the web server 104. The request processor 810 may analyze the allocation request 310 to determine data related to the order data and the customer. In some embodiments, the request processor 810 may determine order data based on the order, where the order data includes: at least one item type, at least one item weight, and at least one assortment channel of the order. The request processor 810 may forward the data to the supply chain network analyzer 820 for supply chain network analysis.

The supply chain network analyzer 820 in this example may determine a customer node associated with the order in a supply chain network representing a supply chain of the retailer, e.g. by analyzing the network data 351 in the database 116. The customer node in this example is determined based on the address to deliver or pick up this order. Each customer node will have a respective supply chain allocation solution based on the disclosed system and method.

In some embodiments, the customer nodes in the supply chain network are associated with a plurality of distinct geographical areas (e.g. different zip codes); and the customer node associated with the order is determined based on a distinct geographical area indicated by the order. The supply chain network analyzer 820 may also determine, based on the order and the customer node, a sub-network of the supply chain network. In some embodiments, the supply chain network analyzer 820 may first determine multiple sub-networks containing the customer node; and then select one sub-network from the multiple sub-networks based on the order data.

In some embodiments, the supply chain network analyzer 820 may further determine, based on cost information associated with the selected sub-network, at least one path from at least one source node to the customer node in the sub-network. In some embodiments, the at least one path includes a plurality of paths; and the supply chain network analyzer 820 sends the plurality of paths to the constraint-based path filter 830 for filtering.

The constraint-based path filter 830 in this example may apply constraints to the plurality of paths to generate filtered paths, e.g. based on the path filtering model 396 in the database 116. In some embodiments, the constraints are applied to the plurality of paths sequentially based on cost information associated with the plurality of paths. For example, the constraint-based path filter 830 may apply constraints to the plurality of paths (i.e. K optimal paths determined by the supply chain network analyzer 820) iteratively from the lowest-cost path to the highest-cost path. For each path, the constraint-based path filter 830 may apply these constraints. In some examples, the constraints comprise: hard constraints that are required to be satisfied by all filtered paths, and soft constraints that are not required to be satisfied by all filtered paths. The hard constraints may include constraints related to at least one of: inventory availability, inventory eligibility, carrier capacity, fulfillment capacity, transport channel eligibility, or node operation time. The soft constraints may include constraints related to at least one of: service level agreement (SLA), or estimated time to delivery. The constraint-based path filter 830 may send the filtered paths to the ranking engine 840 for ranking.

In some embodiments, the constraint-based path filter 830 first applies all of the constraints (both hard and soft) to filter the plurality of paths. If no path satisfies all of these constraints, then the constraint-based path filter 830 applies only the hard constraints to filter the plurality of paths.

When there are multiple orders with multiple customer nodes, each customer node is populated with top K paths. There could be contesting paths for resources from different customers to any node. But these selected paths are selected without any constraints. There may be some paths that may violate SLA in these paths. The constraint-based path filter 830 may select paths for each customer node that satisfies all the constraints.

The ranking engine 840 in this example may rank the filtered paths, e.g. using the path ranking model 398 in the database 116. In some embodiments, the ranking engine 840 may rank the filtered paths according to their respective total costs, and/or their matching degrees to some soft constraints. In some examples, the ranking engine 840 may rank the filtered paths according to their respective delivery time. In some examples, the ranking engine 840 may rank the filtered paths according to a combination of multiple metrics mentioned above. The ranking engine 840 may send the ranked paths to the supply chain allocator 850 for supply chain allocation.

The supply chain allocator 850 in this example may select an optimal path for the order from the filtered and ranked paths, and generate supply chain allocation data 312 based on the optimal path. In some embodiments, the supply chain allocation data 312 comprises data related to at least one of: nodes and edges forming the optimal path, resources allocated along the optimal path at the nodes and edges, cost of delivering the order, and time to deliver the order. The supply chain allocator 850 may transmit the supply chain allocation data 312 to the web server 104, as a response to the allocation request 310.

In some embodiments, the allocation request 310 may be a request for supply chain allocation for a plurality of orders. In response, the supply chain allocation engine 102-2 may generate the supply chain allocation data 312 for the plurality of orders based on at least one of the following manners: allocating the orders based on a first-in first-out (FIFO) mode based on order placed time, allocating the orders in parallel within a micro batch, or allocating the orders based on a cost optimization objective. In the FIFO mode, the supply chain network is changed dynamically such that once a resource is allocated to a previous order, subsequent orders cannot be allocated the same resource. That is, after the supply chain allocation engine 102-2 allocates a path to an order, the supply chain allocation engine 102-2 will update resources in the supply chain network accordingly. In some examples, when no path (satisfying corresponding constraints) is found in the supply chain network for any order of the plurality of orders, the order is dropped.

In an exemplary use case, the system receives a set of orders each day to fulfill on a given supply chain network, with inventory, capacity and SLA constraints. The orders may be allocated by prioritizing on the first come first serve basis. Thus, once resources are consumed by previous orders, subsequent orders should look for other resources. Each customer node has a respective zip code and can be sourced from different type of sources which are connected on the supply chain network on a given day. The system tries to find the cheapest paths that are feasible, where the supply chain network along with its cost is assumed to be constant on any given day. The cost structure of the supply chain network (and each sub-network) is dependent on the item type (e.g. sortable or non-sortable), weight of the delivery, etc. The total time taken to deliver is dependent on node processing time, node cut off times and total transit time on a selected path. For SLA constraint, the system uses this time taken metric to check for any violations. The SLA constraints are considered soft, such that when the system could not find any solution satisfying the SLA constraints, the system would find a solution which delivers with minimum violation. The system uses a two-stage method. In the first stage, the system uses an ant colony optimization (ACO) algorithm to generate the top K best (e.g. least-cost) paths between a source and the customer destination with optional intermediate hops. In the second stage, the system checks for the availability of resource in all the K paths sequentially (lower to higher costs) to allocate supply chain for an order. There may be additional operational constraints like: non-sortable items cannot go through a truck, operating time zone of stores or fulfillment centers, etc.

In the disclosed supply chain allocation method, the paths computed and stored during the first stage or phase can be re-used repeatedly during the second stage or phase for allocation, giving this method a sub-linear run-time. In some embodiments, to allocate a given order, the system selects paths that can serve this order, check for the resources along the path, and filter the paths based on order type, weight, customer node of the order. While checking for resources on any path during order allocation, the system can interact with different subsystems like: an inventory system, a carrier capacity system, a fulfillment capacity system, a service level agreement (SLA) system, a node operating time system. In some embodiments, a path is accepted for selection only when all the constraints are satisfied along the path and at all nodes present in the path. This method is dynamic to ever changing business strategies and has flexibility to incorporate new optimization-based techniques in order allocation.

Figure 9:
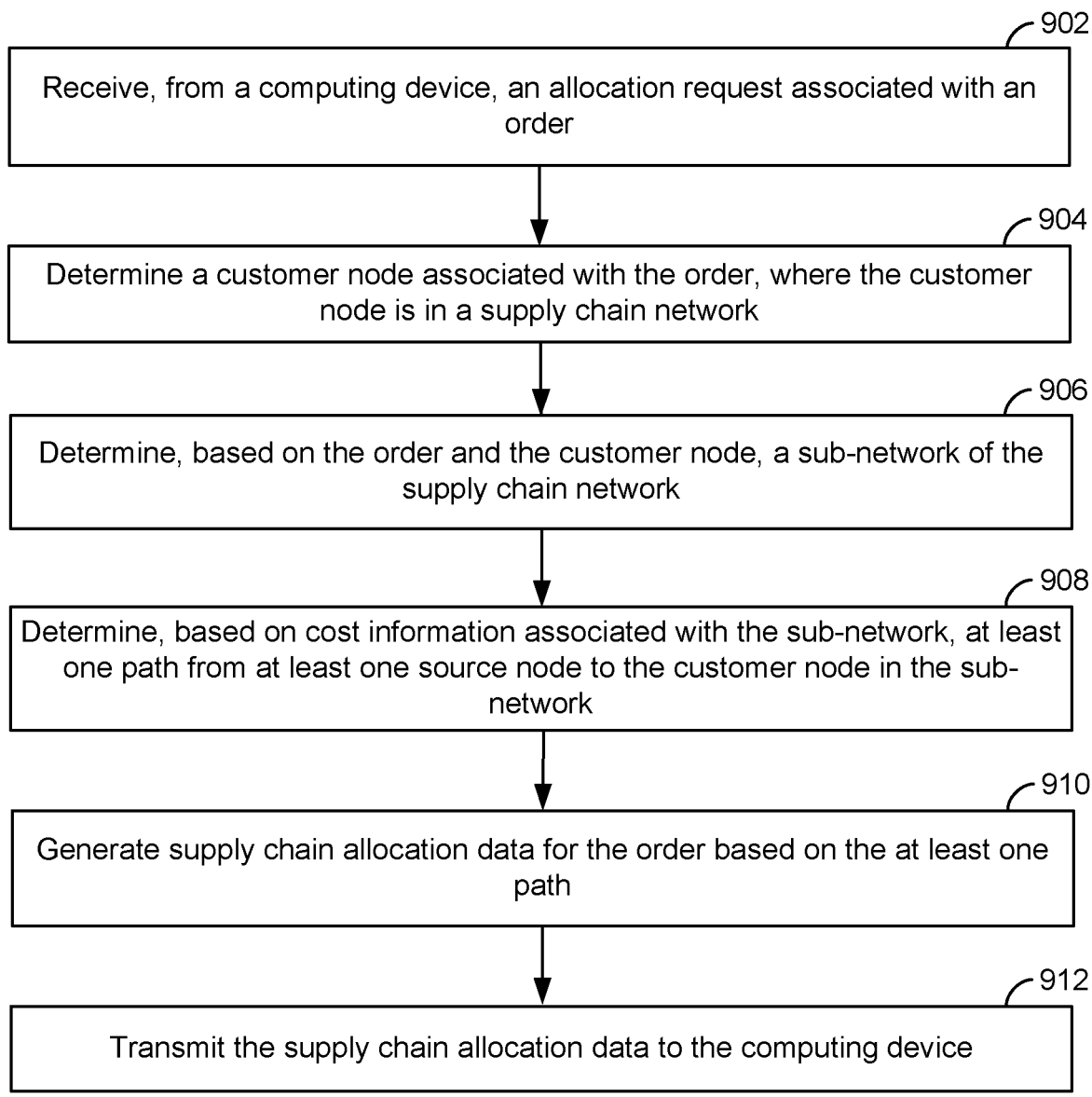
FIG. 9 is a flowchart illustrating an exemplary method for allocating optimal supply chain resources based on order data, in accordance with some embodiments of the present teaching.

FIG. 9 is a flowchart illustrating an exemplary method 900 for allocating optimal supply chain resources based on order data, in accordance with some embodiments of the present teaching. In some embodiments, the method 900 can be carried out by one or more computing devices, such as the supply chain allocation engine 102 and/or the cloud-based engine 121 of FIG. 1. Beginning at operation 902, an allocation request associated with an order is received from a computing device. At operation 904, a customer node associated with the order is determined, where the customer node is in a supply chain network. Based on the order and the customer node, a sub-network of the supply chain network is determined at operation 906. Based on cost information associated with the sub-network, at least one path from at least one source node to the customer node is determined at operation 908 in the sub-network. Supply chain allocation data is generated at operation 910 for the order based on the at least one path. The supply chain allocation data is transmitted at operation 912 to the computing device. In some examples, if no path is found in the supply chain network for the order, the order is dropped.

Although the methods described above are with reference to the illustrated flowcharts, it will be appreciated that many other ways of performing the acts associated with the methods can be used. For example, the order of some operations may be changed, and some of the operations described may be optional.

The methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system, comprising:
   a non-transitory memory having instructions stored thereon; and
   at least one processor operatively coupled to the non-transitory memory, and configured to read the instructions to:
   receive, from a computing device, an allocation request associated with an order,
   determine a customer node associated with the order, wherein the customer node is in a supply chain network,
   determine, based on the order and the customer node, a sub-network of the supply chain network at least by:
   generating a plurality of first-level sub-networks of the supply chain network, wherein each of the plurality of first-level sub-networks is associated with a corresponding item type,
   generating a plurality of second-level sub-networks based on each of the plurality of first-level sub-networks, wherein each of the plurality of second-level sub-networks is associated with a corresponding item weight range,
   generating a plurality of third-level sub-networks based on each of the plurality of second-level sub-networks, wherein each of the plurality of third-level sub-networks is associated with a corresponding assortment channel, and
   executing a machine learning model on the plurality of third-level sub-networks in parallel to select the sub-network from the plurality of third-level sub-networks based on the order and the customer node,
   determine, based on cost information associated with the sub-network, at least one path from at least one source node to the customer node in the sub-network,
   generate supply chain allocation data for the order based on the at least one path, and
   transmit the supply chain allocation data to the computing device.

2. The system of claim 1, wherein:
   the supply chain network is a visual representation of a supply chain, and comprises edges and nodes;
   the supply chain network comprises: source nodes representing distribution centers, fulfillment centers and/or stores, intermediate nodes representing destination delivery units and/or sortation centers, and customer nodes representing customers;
   the supply chain network comprises a plurality of edges, each of which connects two nodes in the supply chain network, represents a type of transportation between the two nodes, and is associated with cost and time to transport items between the two nodes.

3. The system of claim 2, wherein:
   the supply chain network comprises a plurality of sub-networks covering all customer nodes in the supply chain network; and
   the plurality of sub-networks are different from each other according to at least one of: item types, item weights, assortment channels, or fulfillment channels.

4. The system of claim 3, wherein each path from one node to another node in the supply chain network is associated with a total cost that comprises:
   node costs for nodes along the path, including material cost for the source nodes and sortation cost for each sortation center; and
   edge costs for edges along the path, including cost related to each transportation type.

5. The system of claim 4, wherein the at least one processor is further configured to:
   for each respective sub-network of the plurality of sub-networks, add a virtual node to the respective sub-network as a common source node shared by all source nodes in the respective sub-network; and for each respective customer node in the respective sub-network, perform an ant colony optimization model on the respective sub-network to determine K optimal inverse paths from the respective customer node to the virtual node, K being a positive integer, wherein the K optimal inverse paths have lowest total costs among paths from the respective customer node to the virtual node in the respective sub-network, rank the K optimal inverse paths to determine an optimal path having a lowest total cost among paths from all source nodes to the respective customer node in the respective sub-network, and store the optimal path in a database.

6. The system of claim 5, wherein the sub-network is determined based on:

determining, based on the order, order data including: at least one item type, at least one item weight, and at least one assortment channel of the order;

determining multiple sub-networks containing the customer node; and selecting the sub-network from the multiple sub-networks based on the order data.

7. The system of claim 6, wherein:

the customer nodes in the supply chain network are associated with a plurality of distinct geographical areas; and the customer node associated with the order is determined based on a distinct geographical area indicated by the order.

8. The system of claim 1, wherein:

the at least one path includes a plurality of paths; and the supply chain allocation data is generated based on:

applying constraints to the plurality of paths to generate filtered paths, selecting an optimal path from the filtered paths, wherein the supply chain allocation data comprises data related to: nodes and edges forming the optimal path, resources allocated along the optimal path at the nodes and edges, cost of delivering the order, and time to deliver the order.

9. The system of claim 8, wherein:

the constraints are applied to the plurality of paths sequentially based on cost information associated with the plurality of paths;

the constraints comprise: hard constraints that are required to be satisfied by all filtered paths, and soft constraints that are not required to be satisfied by all filtered paths;

the hard constraints include constraints related to at least one of: inventory availability, inventory eligibility, carrier capacity, fulfillment capacity, transport channel eligibility, or node operation time; and the soft constraints include constraints related to at least one of: service level agreement, or estimated time to delivery.

10. The system of claim 1, wherein the at least one processor is further configured to:

receive a request for supply chain allocation for a plurality of orders; and generate supply chain allocation data for the plurality of orders based on at least one of:

allocating the plurality of orders based on a first-in first-out mode, wherein the supply chain network is changed dynamically such that once a resource is allocated to a previous order, subsequent orders cannot be allocated the same resource, allocating the plurality of orders in parallel within a micro batch, or allocating the plurality of orders based on a cost optimization objective.

11. The system of claim 10, wherein:

at least one order of the plurality of orders is dropped when no path is found in the supply chain network for the at least one order.

12. A computer-implemented method, comprising:

receiving, from a computing device, an allocation request associated with an order;

determining a customer node associated with the order, wherein the customer node is in a supply chain network;

determining, based on the order and the customer node, a sub-network of the supply chain network at least by:

generating a plurality of first-level sub-networks of the supply chain network, wherein each of the plurality of first-level sub-networks is associated with a corresponding item type, generating a plurality of second-level sub-networks based on each of the plurality of first-level sub-networks, wherein each of the plurality of second-level sub-networks is associated with a corresponding item weight range, generating a plurality of third-level sub-networks based on each of the plurality of second-level sub-networks, wherein each of the plurality of third-level sub-networks is associated with a corresponding assortment channel, and executing a machine learning model on the plurality of third-level sub-networks in parallel to select the sub-network from the plurality of third-level sub-networks based on the order and the customer node;

determining, based on cost information associated with the sub-network, at least one path from at least one source node to the customer node in the sub-network;

generating supply chain allocation data for the order based on the at least one path; and transmitting the supply chain allocation data to the computing device.

13. The computer-implemented method of claim 12, wherein:

the supply chain network is a visual representation of a supply chain, and comprises edges and nodes;

the supply chain network comprises: source nodes representing distribution centers, fulfillment centers and/or stores, intermediate nodes representing destination delivery units and/or sortation centers, and customer nodes representing customers;

the supply chain network comprises a plurality of edges, each of which connects two nodes in the supply chain network, represents a type of transportation between the two nodes, and is associated with cost and time to transport items between the two nodes;

the supply chain network comprises a plurality of sub-networks covering all customer nodes in the supply chain network; and the plurality of sub-networks are different from each other according to at least one of: item types, item weights, assortment channels, or fulfillment channels.

14. The computer-implemented method of claim 13, wherein each path from one node to another node in the supply chain network is associated with a total cost that comprises:
- node costs for nodes along the path, including material cost for the source nodes and sortation cost for each sortation center; and
- edge costs for edges along the path, including cost related to each transportation type.

15. The computer-implemented method of claim 14, further comprising:
- for each respective sub-network of the plurality of sub-networks,
  - adding a virtual node to the respective sub-network as a common source node shared by all source nodes in the respective sub-network; and
  - for each respective customer node in the respective sub-network,
    - performing an ant colony optimization model on the respective sub-network to determine K optimal inverse paths from the respective customer node to the virtual node, K being a positive integer, wherein the K optimal inverse paths have lowest total costs among paths from the respective customer node to the virtual node in the respective sub-network,
    - ranking the K optimal inverse paths to determine an optimal path having a lowest total cost among paths from all source nodes to the respective customer node in the respective sub-network, and
    - storing the optimal path in a database.

16. The computer-implemented method of claim 15, wherein determining the sub-network comprises:
- determining, based on the order, order data including: at least one item type, at least one item weight, and at least one assortment channel of the order;
- determining multiple sub-networks containing the customer node; and
- selecting the sub-network from the multiple sub-networks based on the order data.

17. The computer-implemented method of claim 16, wherein:
- the customer nodes in the supply chain network are associated with a plurality of distinct geographical areas; and
- the customer node associated with the order is determined based on a distinct geographical area indicated by the order.

18. A non-transitory computer readable medium having instructions stored thereon, wherein the instructions, when executed by at least one processor, cause at least one device to perform operations comprising:
- receiving, from a computing device, an allocation request associated with an order;
- determining a customer node associated with the order, wherein the customer node is in a supply chain network;
- determining, based on the order and the customer node, a sub-network of the supply chain network at least by:
  - generating a plurality of first-level sub-networks of the supply chain network, wherein each of the plurality of first-level sub-networks is associated with a corresponding item type,
  - generating a plurality of second-level sub-networks based on each of the plurality of first-level sub-networks, wherein each of the plurality of second-level sub-networks is associated with a corresponding item weight range,
  - generating a plurality of third-level sub-networks based on each of the plurality of second-level sub-networks, wherein each of the plurality of third-level sub-networks is associated with a corresponding assortment channel, and
  - executing a machine learning model on the plurality of third-level sub-networks in parallel to select the sub-network from the plurality of third-level sub-networks based on the order and the customer node;
- determining, based on cost information associated with the sub-network, at least one path from at least one source node to the customer node in the sub-network;
- generating supply chain allocation data for the order based on the at least one path; and
- transmitting the supply chain allocation data to the computing device.

\* \* \* \* \*